US007464251B2

(12) United States Patent
Mirsky

(10) Patent No.: US 7,464,251 B2
(45) Date of Patent: *Dec. 9, 2008

(54) METHOD AND APPARATUS FOR CONFIGURING ARBITRARY SIZED DATA PATHS COMPRISING MULTIPLE CONTEXT PROCESSING ELEMENTS

(75) Inventor: Ethan A. Mirsky, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 10/375,543

(22) Filed: Feb. 27, 2003

(65) Prior Publication Data

US 2003/0182346 A1    Sep. 25, 2003

Related U.S. Application Data

(63) Continuation of application No. 09/795,672, filed on Feb. 26, 2001, now Pat. No. 6,591,357, which is a continuation of application No. 09/075,412, filed on May 8, 1998, now Pat. No. 6,226,735.

(51) Int. Cl.
*G06F 15/80* (2006.01)
*G06F 9/315* (2006.01)
(52) U.S. Cl. .................. 712/15; 712/221; 712/225
(58) Field of Classification Search .......... 712/11, 712/14, 19, 18, 22, 15, 221, 225; 708/207, 708/232, 506, 509, 498, 552, 629; 716/16
See application file for complete search history.

(56) References Cited

U.S. PATENT DOCUMENTS 3,818,203 A * 6/1974 Perlowski et al. .......... 708/232
3,887,799 A * 6/1975 Lindgren .................... 708/209
4,523,292 A * 6/1985 Armer ........................ 708/703
4,597,041 A   6/1986 Guyer et al. ................ 364/200
4,748,585 A   5/1988 Chiarulli et al. ............ 364/900

(Continued)

OTHER PUBLICATIONS

Valero-Garcia, et al.; "Implementation of Systolic Algorithms Using Pipelined Functional Units"; IEEE Proceedings on the International Conf. on Application Specific Array Processors; Sep. 5-7, 1990; pp. 272-283.
Razdan, et al.; "A High-Performance Microarchitecture with Hardware-Programmable Functional Units"; Micro-27 Proceedings of the 27th Annual International Symposium on Microarchitecture; Nov. 30-Dec. 2, 1994; pp.172-180.
Guo, et al.; "A Novel Programmable Interconnect Architecture with Decoded Ram Storage"; Proceedings of the IEEE Custom Integrated Circuits Conference; May 1-4, 1994, pp. 193-196.

(Continued)

*Primary Examiner*—Daniel Pan

(57) ABSTRACT

A method and an apparatus for configuring arbitrary sized data paths comprising multiple context processing elements (MCPEs) are provided. Multiple MCPEs may be chained to form wider-word data paths of arbitrary widths, wherein a first ALU serves as the most significant byte (MSB) of the data path while a second ALU serves as the least significant byte (LSB) of the data path. The ALUs of the data path are coupled using a left-going, or forward, carry chain for transmitting at least one carry bit from the LSB ALU to the MSB ALU. The MSB ALU comprises configurable logic for generating at least one signal in response to a carry bit received over the left-going carry chain, the at least one signal comprising a saturation signal and a saturation value. The MCPEs of the data path use configurable logic to manipulate a resident bit sequence in response to the saturation signal transmitted thereby reconfiguring, or changing the operation of, the data path in response to the saturation signal. The carry chains support carry operations for non-local functions comprising minimum and maximum arithmetic functions.

55 Claims, 30 Drawing Sheets

U.S. PATENT DOCUMENTS

| | | | | |
|---|---|---|---|---|
| 4,754,412 | A | | 6/1988 | Deering .................... 364/736 |
| 4,841,468 | A | * | 6/1989 | Miller et al. ................ 708/625 |
| 4,858,113 | A | | 8/1989 | Saccardi .................... 364/200 |
| 4,870,302 | A | | 9/1989 | Freeman .................... 307/465 |
| 5,020,059 | A | | 5/1991 | Gorin et al. ................ 371/11.3 |
| 5,047,975 | A | * | 9/1991 | Patti et al. .................. 708/706 |
| 5,081,607 | A | * | 1/1992 | Bates et al. ................ 708/710 |
| 5,233,539 | A | | 8/1993 | Agrawal et al. ............ 364/489 |
| 5,301,340 | A | | 4/1994 | Cook ......................... 395/800 |
| 5,317,209 | A | | 5/1994 | Garverick et al. .......... 307/465 |
| 5,336,950 | A | | 8/1994 | Popli et al. .................. 307/465 |
| 5,426,378 | A | | 6/1995 | Ong ............................ 326/39 |
| 5,457,408 | A | | 10/1995 | Leung ......................... 326/38 |
| 5,469,003 | A | | 11/1995 | Kean ........................... 326/39 |
| 5,581,199 | A | | 12/1996 | Pierce et al. ................. 326/41 |
| 5,684,728 | A | * | 11/1997 | Okayama et al. ........... 708/525 |
| 5,684,980 | A | | 11/1997 | Casselman .................. 395/500 |
| 5,742,180 | A | | 4/1998 | DeHon et al. ................ 326/40 |
| 5,754,818 | A | | 5/1998 | Mohamed ................... 395/417 |
| 5,765,209 | A | | 6/1998 | Yetter ......................... 711/207 |
| 5,778,439 | A | | 7/1998 | Trimberger et al. ......... 711/153 |
| 5,854,760 | A | * | 12/1998 | Ikenaga et al. ............... 365/49 |
| 5,880,598 | A | | 3/1999 | Duong ........................ 326/41 |
| 6,055,619 | A | * | 4/2000 | North et al. .................. 712/36 |
| 6,226,735 | B1 | * | 5/2001 | Mirsky ....................... 712/18 |
| 6,591,357 | B2 | * | 7/2003 | Mirsky ....................... 712/18 |

OTHER PUBLICATIONS

Vuillemin, et al.; "Programmable Active Memories: Reconfigurable Systems Come of Age"; IEEE Transactions on VLSI Systems; 1995; pp. 1-15.

Hon, et al; "Reinventing Computing", Mar. 1996; MIT A1 Lab, p. 1.

Baker, "Programming Silicon"; Aug. 28, 1995, Electronic Engineering Times, p. 73.

Brown; "Smart Compilers Puncture Code Bloat"; Oct. 9, 1995, Electronic Engineering Times; pp. 38 and 42.

Snyder; "A Taxonomy of Synchronous Parallel Machines"; Proceedings of the 1988 International Conference on Parallel Processing; Aug. 15-19, 1998; pp. 281-285.

Gray, et al.; "Configurable Hardware: A New Paradigm for Computation"; 1989; Massachusetts Institute of Technology; pp. 279-296.

Carter, et al.; "A User Programmable Reconfigurable Logic Array"; IEEE 1986 Custom Integrated Circuits Conference; pp. 233-235.

Johnson, et al.; "General-Purpose Systolic Arrays"; IEEE Nov. 1993; pp. 20-31.

Clark; "Pilkington Preps Reconfigurable Video DSP"; EE Times, week of Jul. 31, 1995.

Fiske, et al.; "Reconfigurable Arithmetic Processor"; The 15th Annual International Symposium on Computer Architecture; May 30-Jun. 2, 1988; pp. 30-36.

Beal, et al.; Design of a Processor Element for a High Performance Massively Parallel SIMD System; Int'l Journal of High Speed Computing, vol. 7, No. 3; Sep. 1995; pp. 365-390.

Snyder; "An Inquiry into the Benefits of Multiguage Parallel Computation"; Proceedings of the 1995 International Conference on Parallel Processing; Aug. 20-23, 1995; pp. 488-492.

Wang, et al.; "An Array Architecture for Reconfigurable Datapaths: More FPGAs," W.R. Moore & W. Luk; 1994 Abingdon EE&CS Books; p. 35-46.

Bridges; "The GPA Machine: A Generally Partitionable MSIMD Architecture"; IEEE Third Symposium on The Frontiers of Massively Parallel Computation, Feb. 1990; pp. 196-203.

Morton, et al.; "The Dynamically Reconfigurable CAP Array Chip I"; IEEE Journal of Solid-State Circuits, vol. SC-21, No. 5, Oct. 1986; pp. 820-826.

Alexander, et al.; "A Reconfigurable Approach to a Systolic Sorting Architecture"; IEEE Feb. 1989; pp. 1178-1182.

Blazek, et al.; "Design of a Reconfigurable Parallel RISC-Machine"; North-Holland Microprocessing and Microprogramming, 1987; pp. 39-46.

Masera, et al.; "A Microprogrammable Parallel Architecture for DSP"; Proceedings of the International Conference on Circuits and Systems, Jun. 1991; pp. 824-827.

Xilinx Advance Product Information; "XC6200 Field Programmable Gate Arrays"; Jan. 9, 1997 (Version 1.8); pp. 1-53.

Sowa, et al.; "Parallel Execution on the Function-Partitioned Processor with Multiple Instruction Streams"; Systems and Computers in Japan, vol. 22, No. 4, 1991; pp. 22-27.

Wang, et al.; "Distributed Instruction Set Computer"; Proceedings of the 1988 International Conference on Parallel Processing; Aug. 15-19, 1988; pp. 426-429.

Mirsky, Ethan A., "Coarse-Grain Reconfigurable Computing," Thesis submitted at the Massachusetts Institute of Technology, Jun. 1996.

* cited by examiner

| Bits <3:0> Value | Operation | | Bit 4 Function | Bit 5 Function | Bit 6 Function | Bit 7 Function |
|---|---|---|---|---|---|---|
| 0 | Logical Operations | AND | | | No Effect | Set-Bit |
| 1 | | OR | Invert A | Invert B | | |
| 2 | | XOR | | | | |
| 3 | | PASS | | | A/B Select | |
| 4 | Shift Operations | SHIFT LEFT | LSB/MSB Carry Input Select (see Table 3.4.3) | | A/B Select | Signed/ Unsigned |
| 5 | | SHIFT LEFT with SATURATE | | | | |
| 6 | | SHIFT RIGHT | | | | |
| 7 | | PASS with SATURATE | No Effect | | | No Effect |
| 8 | Arithmetic Operation | ADD-0 | Invert A | Invert B | Saturate | Signed/ Unsigned |
| 9 | | ADD-1 | | | | |
| 10 | | ADD with CARRY | | | | |
| 11 | | MIN | | | Ignore MSB | |
| 12 | Multiplication Operations | MULTIPLY | Signed A Select | Signed B Select | Saturate Accumulator | Output Accumulator |
| 13 | | MULTIPLY- ADD | | | | |
| 14 | | MULTIPLY- ADD-ADD | | | | |
| 15 | | LOAD ACCUMULATOR | Accumulator Load Value Select | | No Effect | |

FIG. 5

| BIT | OPCODE | CONTROL | VALUE | EFFECT |
|---|---|---|---|---|
| 4 | ALL | SHIFT CONTROL | 0 | A INPUT |
|  |  |  | 1 | B INPUT |
| <6:5> | ALL | SHIFT CONTROL | 0 | 0 |
|  |  |  | 1 | COPY OF LSB/MSB |
|  |  |  | 2 | UNSIGNED SHIFT |
|  |  |  | 3 | SIGNED SHIFT |
| 7 | ALL EXCEPT: PASS WITH SATURATE | SIGNED/ UNSIGNED | 0 | UNSIGNED SHIFT |
|  |  |  | 1 | SIGNED SHIFT |

*FIG. 6*

| ADD OPERATION | CARRY FOR NON-LSB MCPEs | CARRY FOR LSB MCPEs |
|---|---|---|
| ADD-0 | CARRY-IN | 0 |
| ADD-1 | CARRY-IN | 1 |
| ADD WITH CARRY | CARRY-IN | CARRY-IN |

*FIG. 7*

| BIT | VALUE | EFFECT ON ADDS | EFFECT ON MIN |
|---|---|---|---|
| 4 | 0 | NORMAL A INPUT | |
| | 1 | INVERTED A INPUT | |
| 5 | 0 | NORMAL B INPUT | |
| | 1 | INVERTED B INPUT | |
| 6 | 0 | NORMAL ARITHMETIC | USE MSB |
| | 1 | SATURATED ARITHMETIC | IGNORE MSB |
| 7 | 0 | UNSIGNED ARITHMETIC | |
| | 1 | SIGNED ARITHMETIC | |

FIG. 8

| CONFIGURATION | EFFECT WHEN SET TO "0" | EFFECT WHEN SET TO "1" |
|---|---|---|
| LSB | MCPE IS NOT THE LSB | MCPE IS THE LSB |
| MSB | MCPE IS NOT THE MSB | MCPE IS THE MSB |
| RightSource | SELECTS THE RIGHT CARRY-IN SOURCE-SEE TABLE 3.5.2 | |
| LeftSource | SELECTS THE LEFT CARRY-IN SOURCE-SEE TABLE 3.5.2 | |
| CarryPipelineR | RIGHT CARRY-IN IS NOT PIPELINED | RIGHT CARRY-IN IS PIPELINED |
| CarryPipelineL | LEFT CARRY-IN IS NOT PIPELINED | LEFT CARRY-IN IS PIPELINED |

*FIG. 11*

| RightSource/ LeftSource Value | CARRY SOURCE |
|---|---|
| 0 | CONSTANT ZERO |
| 1 | CONSTANT ZERO |
| 2 | EAST MCPE CARRY-OUT |
| 3 | SOUTH MCPE CARRY-OUT |
| 4 | WEST MCPE CARRY-OUT |
| 5 | NORTH MCPE CARRY-OUT |
| 6 | LOCAL MCPE CARRY-OUT |
| 7 | REDUCE[3] (PIPELINED) |

*FIG. 13*

| Operation | LSB/MSB | Signed/Unsigned | CoutR Value | CoutL Value | Saturate Select Output Value |
|---|---|---|---|---|---|
| Logical Operations | | N/A | 0 | 0 | 0 |
| SHIFT LEFT | MSB | Unsigned | 1 iff MSB overflows | MSB carry-out | 1 |
| | MSB | Signed | 1 iff word overflows past positive or negative maxint | Bit[MSB-1] carry-out | Invert of Sign Bit |
| | Other | N/A | CinL | Shift Carry Value | Saturate Select Input |
| SHIFT RIGHT | MSB | Unsigned | Shift Carry Value | CinR | 0 |
| | MSB | Signed | Shift Carry Value | CinR & Sign Bit | 0 |
| | LSB | N/A | LSB carry-out | CoutR | Saturate Select Input |
| | Other | N/A | Shift Carry Value | CinR | Saturate Select Input |
| PASS with SATURATE | N/A | N/A | CinL | CinR | Saturate Select Input |
| Unsigned ADDs with A or B inverted (not both) and Unsigned MIN | MSB | Unsigned | 1 iff subtract results in a negative number: 0 on the MSB overflow bit | The Addition's Carry Value | 0 |
| | Other | Unsigned | CinL | | Saturate Select Input |
| All Other ADDs | MSB | Unsigned | 1 iff MSB overflows | The Addition's Carry Value | 1 |
| | MSB | Signed | 1 iff word overflows past positive or negative maxint | The Addition's Carry Value | Sign Bit |
| | Other | N/A | CinL | | Saturate Select Input |
| Signed MIN | MSB | Signed | Sign Bit | The Addition's Carry Value | Sign Bit |
| | Other | Signed | CinL | | Saturate Select Input |
| Multiply Operations | MSB | Unsigned | 1 iff Accumulator MSB overflows | The Accumulator's Carry Value | 1 |
| | MSB | Signed | 1 iff Accumulator word overflows past positive or negative maxint | The Accumulator's Carry Value | Sign Bit |
| | Other | N/A | CinL | | Saturate Select Input |

FIG. 14

| COUNT | BYTE | BYTE CONTENTS |
|---|---|---|
| 1 | MASK HIGH BYTE | {1'b1, MASK[14:8]} |
| 2 | ADDRESS HIGH BYTE | {VIRTUAL/PHYSICAL SELECT, ADDRESS[14:8]} |
| 3 | MASK LOW BYTE | MASK[7:0] |
| 4 | ADDRESS LOW BYTE | ADDRESS[7:0] |
| 6 | CONTEXT | SEE FIGURE 9 |
| 5 | BYTE COUNT | COUNT[7:0] |
| 7 | BYTE STREAM | DATA |
| ⋮ | | |

FIG. 19

| CONTEXT | BIT <7> READ/WRITE | BITS<6:3>* (MAJOR CONTEXT) | BITS<2:0>* (MINOR CONTEXT) |
|---|---|---|---|
| HARDWIRED RESET CONTEXT | READ = 1'b0; WRITE = 1'b1; | 0 | 0 |
| | | | 1 |
| | | | 7 |
| HARDWIRED STALL CONTEXT | | 1 | 0 |
| | | | 1 |
| | | | 7 |
| PROGRAMMABLE RUN CONTEXT | | 2 | 0 |
| | | | 1 |
| | | | 7 |
| PROGRAMMABLE RUN CONTEXT | | 3 | 0 |
| | | | 1 |
| | | | 7 |
| MAIN MEMORY | | 8 | 0 |
| BLOCK ID | | 9 | 0 |
| FSM STATE | | 10 | 0 |

FIG. 20

METHOD AND APPARATUS FOR CONFIGURING ARBITRARY SIZED DATA PATHS COMPRISING MULTIPLE CONTEXT PROCESSING ELEMENTS

CROSS-REFERENCE TO RELATED APPLICATIONS

This application is a continuation of U.S. patent application Ser. No. 09/795,672, filed on Feb. 26, 2001 now U.S. Pat. No. 6,591,357, which is a continuation of U.S. patent application Ser. No. 09/075,412, filed May 8, 1998, U.S. Pat. No. 6,226,735, priority of each of which is hereby claimed.

FIELD OF THE INVENTION

This invention relates to array based computing devices. More particularly, this invention relates to a processing architecture that configures arbitrary sized data paths comprising chained processing elements.

BACKGROUND OF THE INVENTION

Advances in semiconductor technology have greatly increased the processing power of a single chip general purpose computing device. The relatively slow increase in the inter-chip communication bandwidth requires modern high performance devices to use as much of the potential on chip processing power as possible. This results in large, dense integrated circuit devices and a large design space of processing architectures. This design space is generally viewed in terms of granularity, wherein granularity dictates that designers have the option of building very large processing units, or many smaller ones, in the same silicon area. Traditional architectures are either very coarse grain, like microprocessors, or very fine grain, like field programmable gate arrays (FPGAs).

Microprocessors, as coarse grain architecture devices, incorporate a few large processing units that operate on wide data words, each unit being hardwired to perform a defined set of instructions on these data words. Generally, each unit is optimized for a different set of instructions, such as integer and floating point, and the units are generally hardwired to operate in parallel. The hardwired nature of these units allows for very rapid instruction execution. In fact, a great deal of area on modern microprocessor chips is dedicated to cache memories in order to support a very high rate of instruction issue. Thus, the devices efficiently handle very dynamic instruction streams.

Most of the silicon area of modern microprocessors is dedicated to storing data and instructions and to control circuitry. Therefore, most of the silicon area is dedicated to allowing computational tasks to heavily reuse the small active portion of the silicon, the arithmetic logic units (ALUs). Consequently very little of the capacity inherent in a processor gets applied to the problem; most of the capacity goes into supporting a high diversity of operations.

Field programmable gate arrays, as very fine grain devices, incorporate a large number of very small processing elements. These elements are arranged in a configurable interconnected network. The configuration data used to define the functionality of the processing units and the network can be thought of as a very large semantically powerful instruction word allowing nearly any operation to be described and mapped to hardware.

Conventional FPGAs allow finer granularity control over processor operations, and dedicate a minimal area to instruction distribution. Consequently, they can deliver more computations per unit of silicon than processors, on a wide range of operations. However, the lack of resources for instruction distribution in a network of prior art conventional FPGAs make them efficient only when the functional diversity is low, that is when the same operation is required repeatedly and that entire operation can be fit spatially onto the FPGAs in the system.

Dynamically programmable gate arrays (DPGAs) dedicate a modest amount of on-chip area to store additional instructions allowing them to support higher operational diversity than traditional FPGAs. However, the silicon area necessary to support this diversity must be dedicated at fabrication time and consumes area whether or not the additional diversity is required. The amount of diversity supported, that is, the number of instructions supported, is also fixed at fabrication time. Furthermore, when regular data path operations are required all instruction stores are required to be programmed with the same data using a global signal broadcasted to all DPGAs.

The limitations present in the prior art FPGA and DPGA networks in the form of limited control over configuration of the individual FPGAs and DPGAs of the network severely limits the functional diversity of the networks. For example, in one prior art FPGA network, all FPGAs must be configured at the same time to contain the same configurations. Consequently, rather than separate the resources for instruction storage and distribution from the resources for data storage and computation, and dedicate silicon resources to each of these resources at fabrication time, there is a need for an architecture that unifies these resources. Once unified, traditional instruction and control resources can be decomposed along with computing resources and can be deployed in an application specific manner. Chip capacity can be selectively deployed to dynamically support active computation or control reuse of computational resources depending on the needs of the application and the available hardware resources.

SUMMARY OF THE INVENTION

A method and an apparatus for configuring arbitrary sized data paths comprising multiple context processing elements (MCPES) are provided. According to one aspect of the invention, multiple MCPEs may be chained to form wider-word data paths of arbitrary widths. A first ALU of a first MCPE serves as the most significant byte (MSB) of the data path while a second ALU of a second MCPE serves as the least significant byte (LSB) of the data path. Carry chains are used to couple the MCPEs of the data path in order to chain forward a carry bit and back-propagate configuration signals through the data path. The ALUs of the data path are coupled using a left-going, or forward, carry chain for transmitting at least one carry bit from the LSB ALU to the MSB ALU. The MSB ALU comprises configurable logic for generating at least one signal in response to a carry bit received over the left-going carry chain, the at least one signal comprising a saturation signal and a saturation value. The saturation signal is generated using logic that tests for saturation in the data path.

The ALUs of the data path are coupled using a right-going carry chain for transmitting the saturation signal back down the data path. The right-going carry chain may comprise two lines coupled among the ALUs of the data path. The right-going carry chain comprises at least one back propagation channel. The saturation signal is transmitted from the MSB ALU through the ALUs of the data path to the LSB ALU using a first back propagation channel. Furthermore, a signal that selects a saturation value is transmitted from the MSB ALU to the LSB ALU using a second back propagation channel. The MCPEs of the data path use configurable logic to manipulate a resident bit sequence in response to the saturation signal transmitted thereby reconfiguring, or changing the operation of, the data path in response to the saturation signal. The carry chains support carry operations for non-local functions comprising minimum and maximum arithmetic functions.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings, in which like references indicate similar elements and in which:

FIG. 5 is the function port encoding of one embodiment.

FIG. 6 is the shift operation modifier bits for the function port encoding of one embodiment.

FIG. 7 is the carry value of the add operations for the function port encoding of one embodiment.

FIG. 8 is the arithmetic operations modifier bits for the function port encoding of one embodiment.

FIG. 11 is the data path configuration data of one embodiment.

FIG. 13 is the carry-in source of one embodiment.

FIG. 14 is the carry value for the operations of one embodiment.

FIG. 19 is the encoding of the configuration byte stream as received by the CNI in one embodiment.

FIG. 20 is the encoding of the command/context byte in one embodiment.

DETAILED DESCRIPTION OF THE INVENTION

A method and an apparatus for configuring arbitrary sized data paths comprising multiple context processing elements (MCPEs) are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
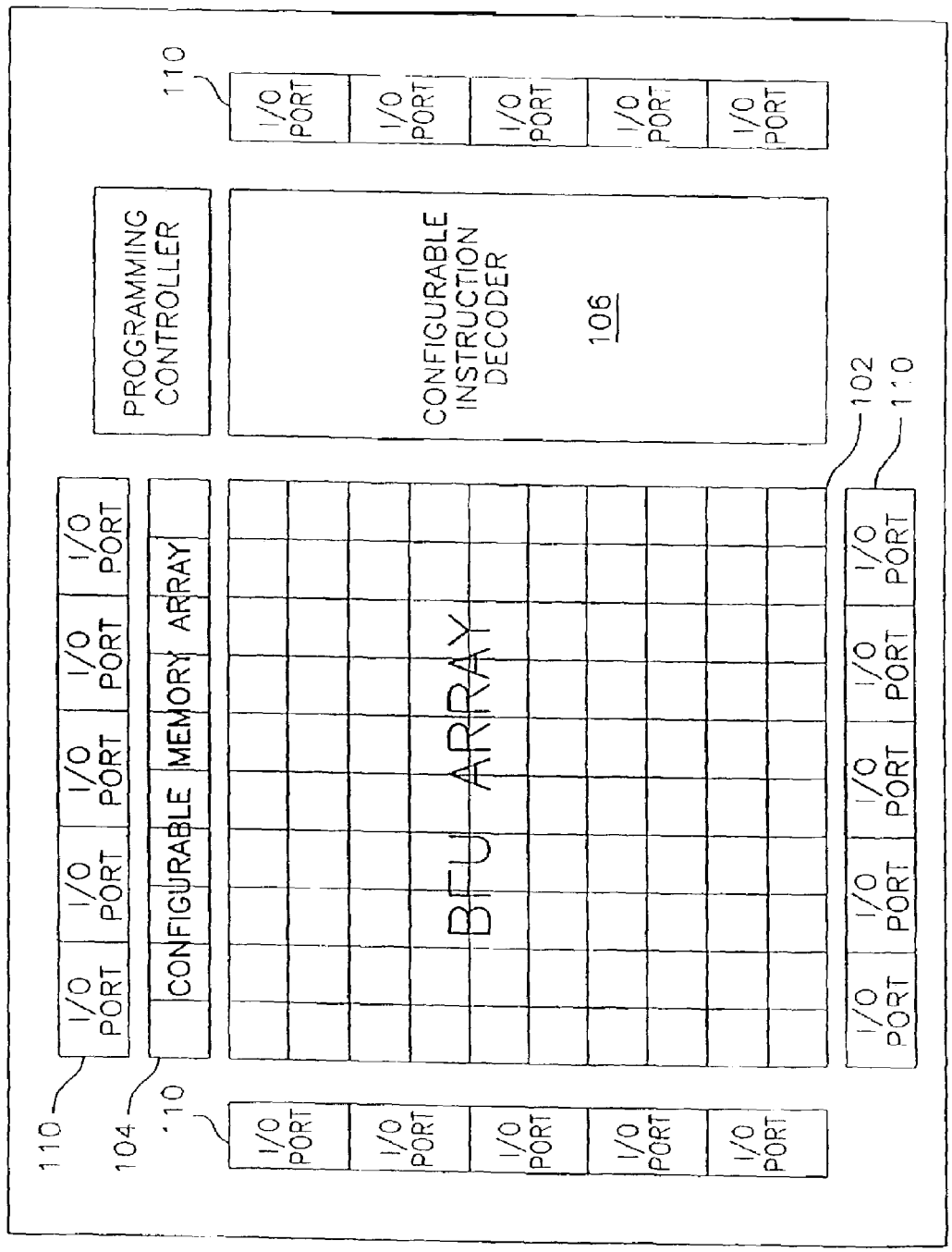
FIG. 1 is the overall chip architecture of one embodiment. This chip architecture comprises many highly integrated components.

FIG. 1 is the overall chip architecture of one embodiment. This chip architecture comprises many highly integrated components. While prior art chip architectures fix resources at fabrication time, specifically instruction source and distribution, the chip architecture of the present invention is flexible. This architecture uses flexible instruction distribution that allows position independent configuration and control of a number of multiple context processing elements (MCPEs) resulting in superior performance provided by the MCPEs. The flexible architecture of the present invention uses local and global control to provide selective configuration and control of each MCPE in an array; the selective configuration and control occurs concurrently with present function execution in the MCPEs.

The chip of one embodiment of the present invention is composed of, but not limited to, a 10 10 array of identical eight-bit functional units, or MCPEs 102, which are connected through a reconfigurable interconnect network. The MCPEs 102 serve as building blocks out of which a wide variety of computing structures may be created. The array size may vary between 2×2 MCPEs and 16×16 MCPEs, or even more depending upon the allowable die area and the desired performance. A perimeter network ring, or a ring of network wires and switches that surrounds the core array, provides the interconnect between the MCPEs and perimeter functional blocks.

Surrounding the array are several specialized units that may perform functions that are too difficult or expensive to decompose into the array. These specialized units may be coupled to the array using selected MCPEs from the array. These specialized units can include large memory blocks called configurable memory blocks 104. In one embodiment these configurable memory blocks 104 comprise eight blocks, two per side, of 4 kilobyte memory blocks. Other specialized units include at least one configurable instruction decoder 106.

Furthermore, the perimeter area holds the various interfaces that the chip of one embodiment uses to communicate with the outside world including: input/output (I/O) ports; a peripheral component interface (PCI) controller, which may be a standard 32-bit PCI interface; one or more synchronous burst static random access memory (SRAM) controllers; a programming controller that is the boot-up and master control block for the configuration network; a master clock input and phase-locked loop (PLL) control/configuration; a Joint Test Action Group (JTAG) test access port connected to all the serial scan chains on the chip; and I/O pins that are the actual pins that connect to the outside world.

Figure 2:
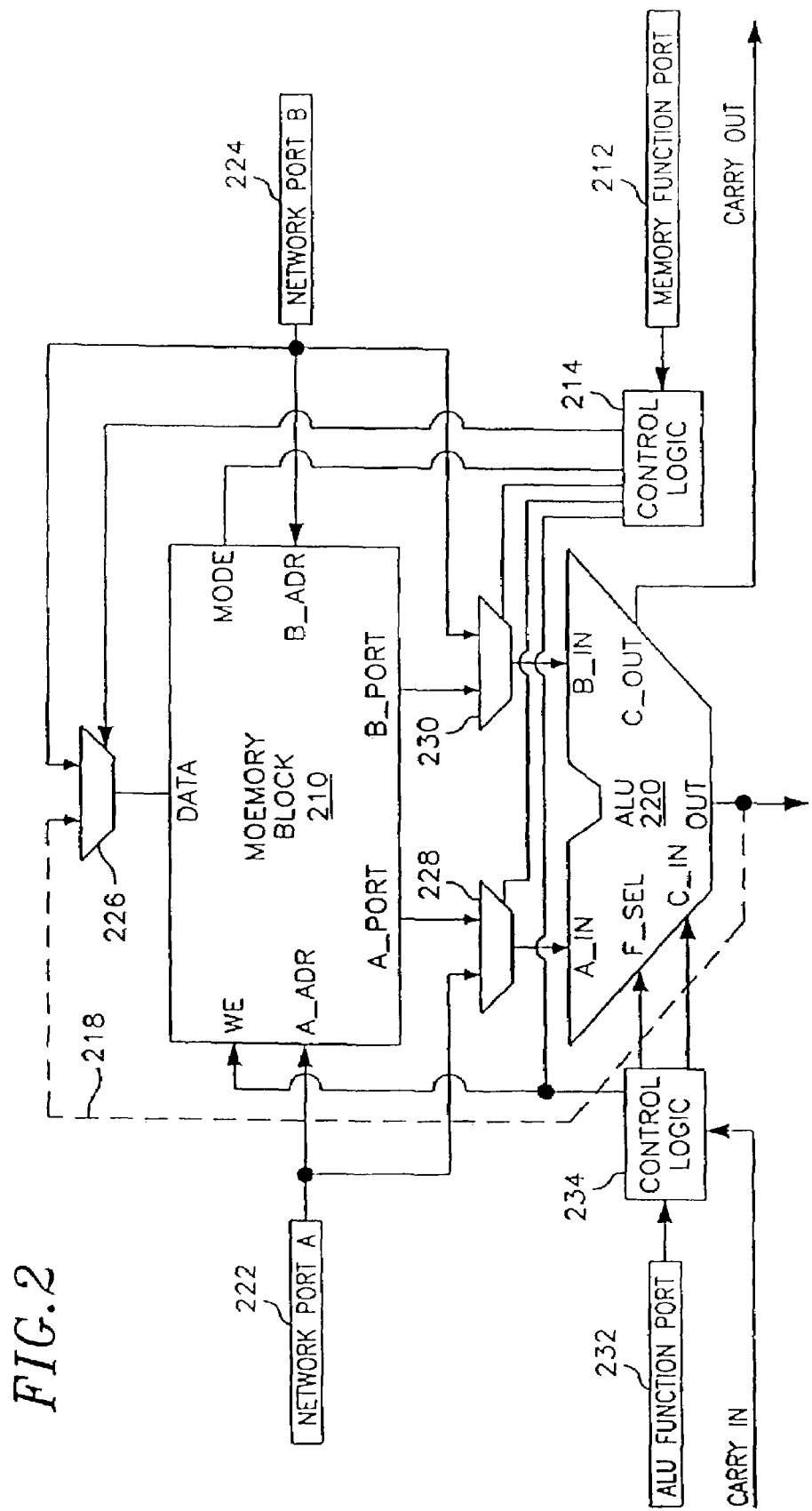
FIG. 2 is an eight bit MCPE core of one embodiment of the present invention.

FIG. 2 is an eight bit MCPE core of one embodiment of the present invention. Primarily the MCPE core comprises memory block 210 and basic ALU core 220. The main memory block 210 is a 256 word by eight bit wide memory, which is arranged to be used in either single or dual port modes. In dual port mode the memory size is reduced to 128 words in order to be able to perform two simultaneous read operations without increasing the read latency of the memory. Network port A 222, network port B 224, ALU function port 232, control logic 214 and 234, and memory function port 212 each have configuration memories (not shown) associated with them. The configuration memories of these elements are distributed and are coupled to a Configuration Network Interface (CNI) (not shown) in one embodiment. These connections may be serial connections but are not so limited. The CNI couples all configuration memories associated with network port A 222, network port B 224, ALU function port 232, control logic 214 and 234, and memory function port 212 thereby controlling these configuration memories. The distributed configuration memory stores configuration words that control the configuration of the interconnections. The configuration memory also stores configuration information for the control architecture. Optionally it can also be a multiple context memory that receives context selecting signals broadcasted globally and locally from a variety of sources.

Figure 3:
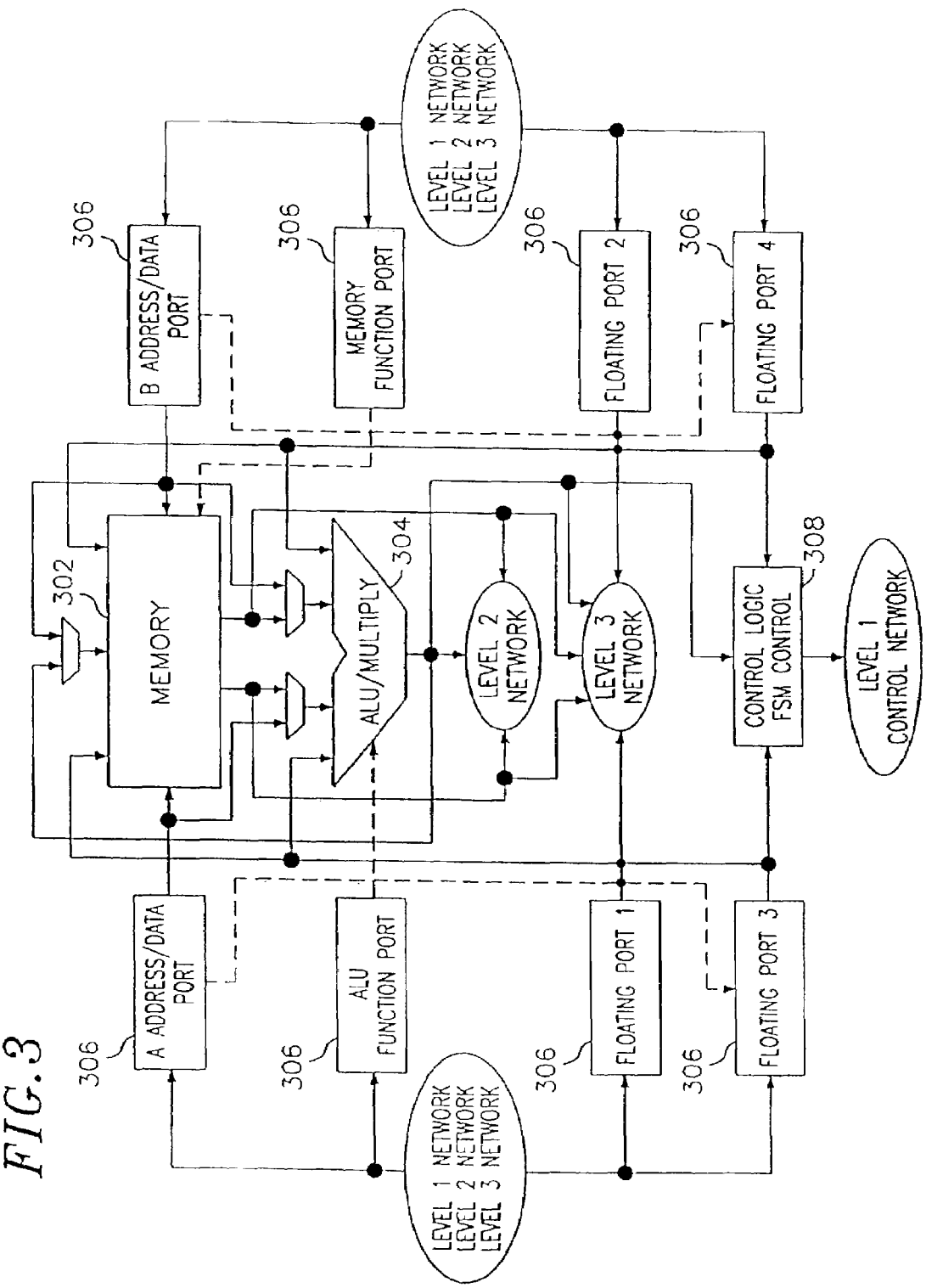
FIG. 3 is a data flow diagram of the MCPE of one embodiment.

The structure of each MCPE allows for a great deal of flexibility when using the MCPEs to create networked processing structures. FIG. 3 is a data flow diagram of the MCPE of one embodiment. The major components of the MCPE include static random access memory (SRAM) main memory 302, ALU with multiplier and accumulate unit 304, network ports 306, and control logic 308. The solid lines mark data flow paths while the dashed lines mark control paths; all of the lines are one or more bits wide in one embodiment. There is a great deal of flexibility available within the MCPE because most of the major components may serve several different functions depending on the MCPE configuration.

The MCPE main memory 302 is a group of 256 eight bit SRAM cells that can operate in one of four modes. It takes in up to two eight bit addresses from A and B address/data ports, depending upon the mode of operation. It also takes in up to four bytes of data, which can be from four floating ports, the B address/data port, the ALU output, or the high byte from the multiplier. The main memory 302 outputs up to four bytes of data. Two of these bytes, memory A and B, are available to the MCPE=s ALU and can be directly driven onto the level 2 network. The other two bytes, memory C and D, are only available to the network. The output of the memory function port 306 controls the cycle-by-cycle operation of the memory 302 and the internal MCPE data paths as well as the operation of some parts of the ALU 304 and the control logic 308. The MCPE main memory may also be implemented as a static register file in order to save power.

Figure 4:
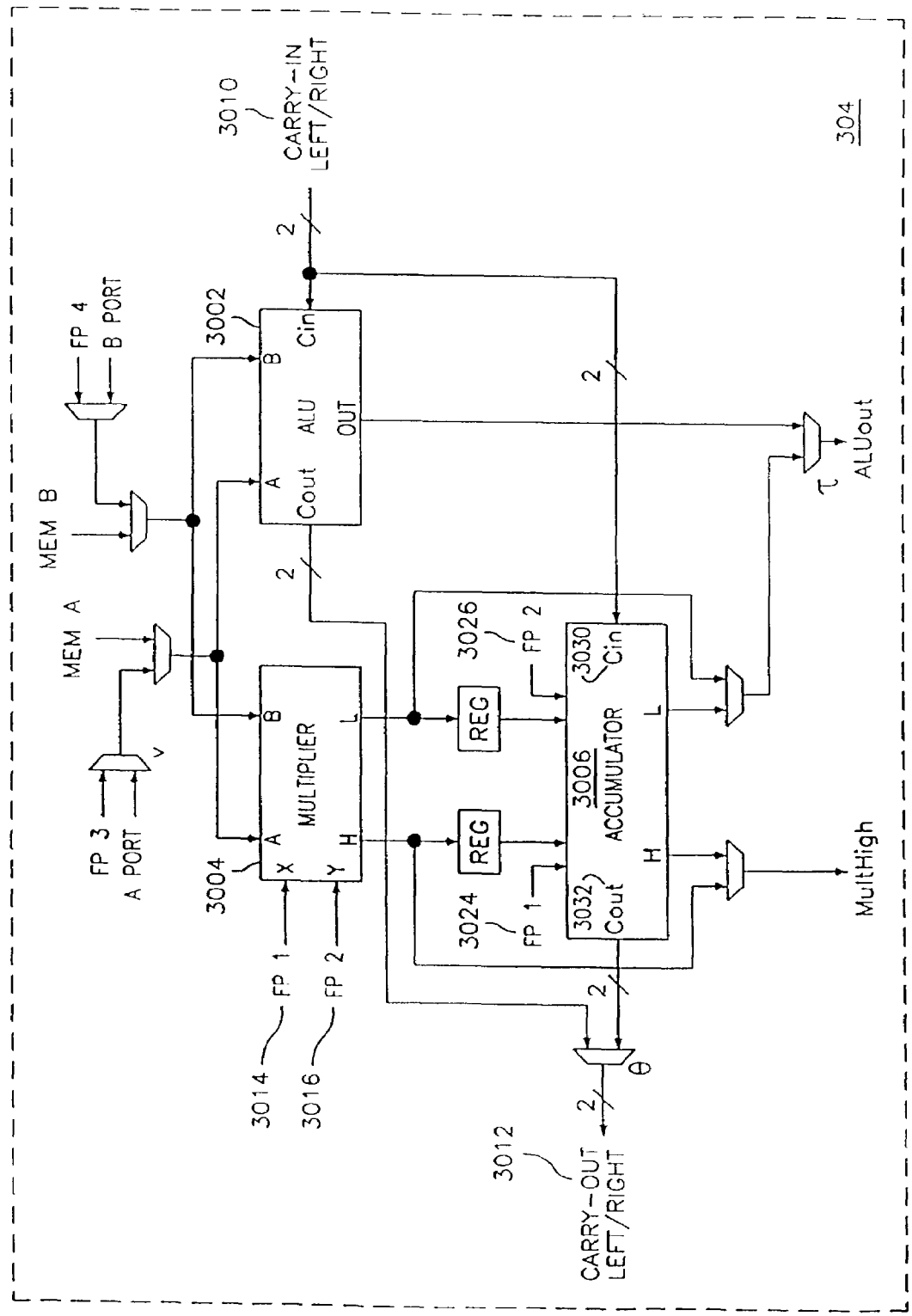
FIG. 4 is a computational unit block diagram of one embodiment.

The ALU with multiplier and accumulate unit 304 of each MCPE is the computational unit of the MCPE and is comprised of three semi-independent functional blocks. FIG. 4 is a computational unit 304 block diagram of one embodiment. The three semi-independent functional blocks comprise an eight bit wide ALU 3002, an 8×8 to sixteen bit multiplier 3004, and a sixteen bit accumulator 3006. The ALU function port 306 specifies the cycle-by-cycle operation of the computational unit.

The ALU 3002 of one embodiment performs logical, shift, arithmetic, and multiplication operations, but is not so limited. The two-bit carries 3010 and 3012 represent a one-bit carry chain in each of the left and right directions. Moreover, there is one additional carry in each direction for specific operations. The computational units 304 in orthogonally adjacent MCPEs can be chained to form wider-word data paths. Correspondingly, carries can be pipelined to allow longer data paths. In operation, minimum, maximum, and saturated arithmetic operations use both the left and right-going carry chains 3010 and 3012. The left-going carry chain is used for the normal operation while the right-going carry chain back-propagates the saturate/minimum selection signal in addition to carrying the right-going output during right shifts.

Specifically, the ALU 3002 performs the following operations: logical PASS; AND; OR; XOR; set bit; shift left by 1; shift left by 1 with saturate; shift right by 1; add; unsigned add with saturate; signed add with saturate; minimum; and signed minimum. The ALU 3002 comprises independently controllable input inverters that allow the creation of variants of the operations performed by the ALU 3002 including, but not limited to, the following operations: NOT; NOR; NAND; XNOR; clear bit, test bit; insert 0, 1, LSB, or carry; subtract; unsigned subtract with saturate; signed subtract with saturate; maximum; and signed maximum. The logical operations and the minimum operation can be converted into their variants by inverting all inputs. The add operation is converted into a subtract operation by inverting the B input into the ALU 3002 and forcing the carry to a value of one.

The multiplier 3004 of each MCPE can perform (A*B+X) and (A*B+X+Y) operations to support the creation of pipelined multipliers. One floating port 3014 provides the X value while a second floating port 3016 provides the Y value. The multiplier 3004 supports signed arithmetic. Multipliers comprising multiple MCPEs may be sign extended.

The accumulator 3006 accumulates the registered multiplier 3004 output or the floating port inputs 3024 and 3026, where one floating port is the MSB and one floating port is the LSB, or the sign-extended version of the LSB floating port. When enabled, the accumulator 3006 accumulates on every cycle. The accumulator can be set to saturate at either 8- or 16-bit points. Signed saturation occurs at both positive and negative infinity. The accumulator 3006 carry input 3030 is taken from the carry-in right selector except when the MCPE is an LSB; for LSB MCPEs, the carry-in accumulator is zero. The accumulator 3006 carry output 3032 is taken from either the 8-bit carry or the 16-bit carry.

The MCPE network ports connect the MCPE network to the internal MCPE logic comprising memory, ALU, and control. There are eight ports in each MCPE, each serving a different set of purposes. The eight ports comprise two address/data ports, two function ports, and four floating ports. The two address/data ports feed addresses and data into the MCPE memories and ALU. The two function ports feed instructions into the MCPE logic. The four floating ports may serve multiple functions. The determination of what function they are serving is made by the configuration of the receivers of their data.

As previously discussed herein, the ALU function port 306 may specify the cycle-by-cycle operation of the computational unit 304. The word that controls the operation of the computational unit 304 is divided into two parts where the lower four bits consist of an operation code specifying the function, and the upper four bits modify these functions. FIG. 5 is the function port encoding of one embodiment.

Shift operations supported by the computational unit of one embodiment include, but are not limited to: shift left; shift left with saturate; shift right; and pass with saturate. These operations perform 1-bit shifts. FIG. 6 is the shift operation modifier bits for the function port encoding of one embodiment. Shifts may be made using either the A or B input of the computational unit as a source, as controlled by bit 6 of the function port value. If the MCPE is an LSB or an MSB of a data path comprising multiple MCPEs, bits 4 and 5 together control the value of the carry input. Bit 7 controls whether the shift is to be handled as a signed or unsigned shift. A signed left shift will generally shift all bits except the MSB in a multiple MCPE data path. The carry-out left (CoutL) signal is the [MSB-1]-bits carry-out. Signed/Unsigned may affect the saturation point for saturated left shifts.

The pass with saturate operation is enabled using an operation code that allows wide-word saturated arithmetic to be emulated on a narrower data path. This operation code uses bit 6 of the function port value to select an input. When the carry-in right (CinR) signal is zero the computational unit passes the input without modification, and when CinR is high the computational unit saturates the word to the value on the incoming saturate select signal; the sign and MSB/LSB indicators are ignored for this purpose. The carries are passed through wherein CinR goes to CoutL, carry-in left (CinL) goes to carry-out right (CoutR), and similarly for the saturate selection and control carries.

Arithmetic operations supported by the computational unit of one embodiment include, but are not limited to: add; subtract; add with carry; and minimum. The three add instructions in the function port command set control the LSB carry-in value in a multiple-MCPE data path. FIG. 7 is the carry value of the add operations for the function port encoding of one embodiment.

FIG. 8 is the arithmetic operations modifier bits for the function port encoding of one embodiment. Modifier bits 4 and 5 invert the A and B operands, respectively. Bit 6 enables or disables saturated addition. During minimum operations, bit 6 may be used to disable the MSB configuration in multiple-MCPE data paths thereby allowing wide-word minimum operations to be emulated on shorter data paths. Bit 7 selects between signed and unsigned arithmetic.

A first add operation is typically used to perform normal addition operations. A second add operation is used in conjunction with one of the input inverts to perform a subtraction operation. The add with carry is typically used in simulating a wider data path on a small number of MCPEs, for example, two MCPEs may simulate a 32-bit data path over two cycles wherein, on the second cycle, the ALUs would use the add with carry operation to provide the bit <15> carry into the MCPE performing the bit <23:16> addition. It is noted that an unsigned add operation with either, but not both, inputs inverted is treated as a subtract for the purposes of saturation; therefore, if this operation results in a zero carry-out from the MSB MCPE of a multiple MCPE data path, the value is assumed to become negative and will saturate at zero if saturation is enabled.

The minimum operation is a special case of an add operation since it performs a subtract and then uses the resulting sign or overflow bit to select between the A and B inputs. The final output uses the original, non-inverted, A and B inputs. A maximum operation is allowed to be performed by inverting both of the inputs.

Figure 9:
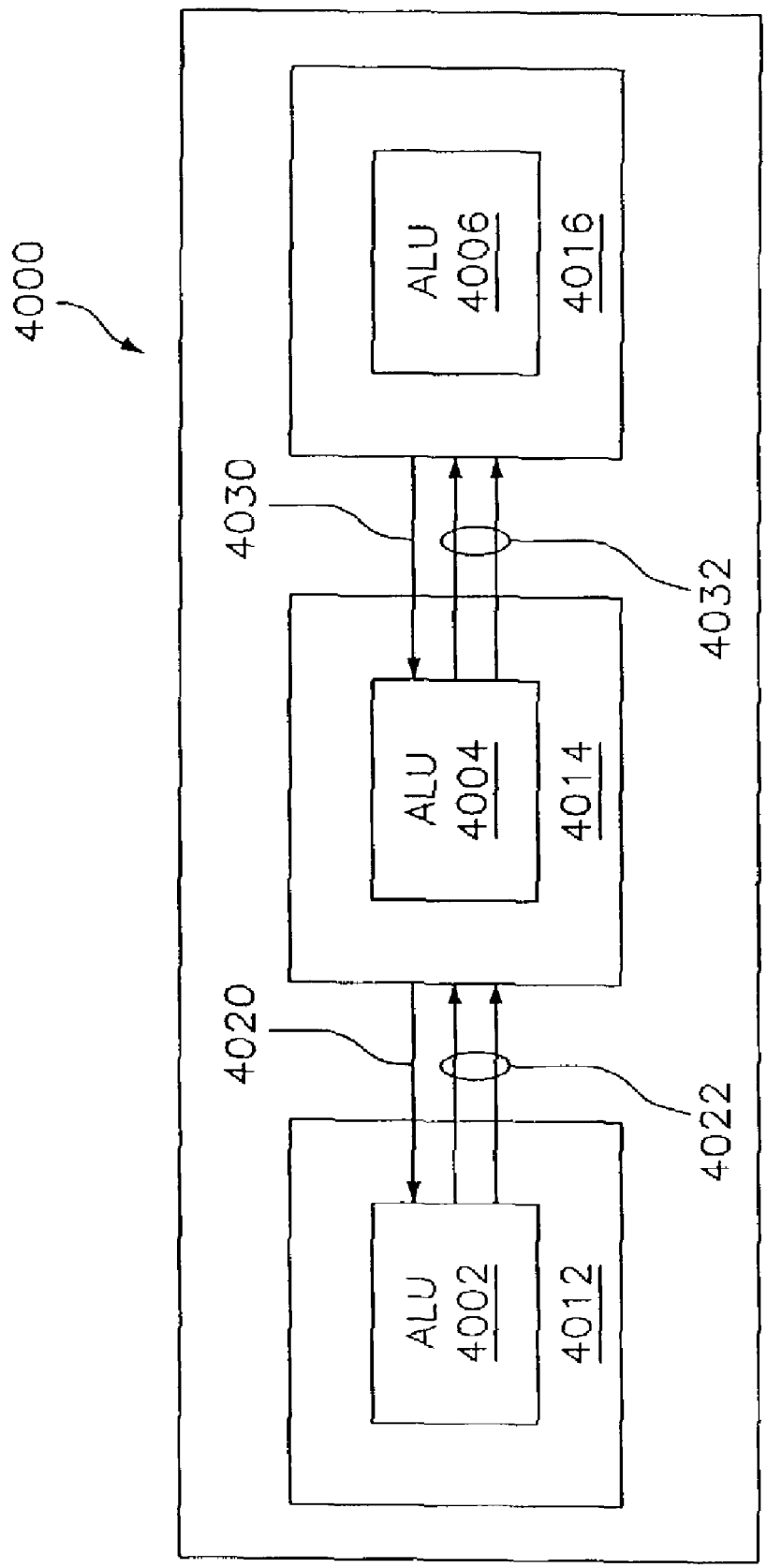
FIG. 9 is a wider-word data path formed by chained ALUs of one embodiment.

As detailed herein, the computational units of multiple MCPEs may be chained to form wider-word data paths of arbitrary widths. FIG. 9 is a wider-word data path 4000 formed by chained ALUs 4002-4006 of one embodiment. The data path 4000 comprises three ALUs 4002-4006 of three MCPEs 4012-4016, respectively, but the embodiment is not so limited. Each of the three ALUs 4002-4006 is an 8-bit ALU so that the three ALUs 4002-4006 form a 24-bit data path 4000, but the embodiment is not so limited. Each of the three MCPEs 4012-4016 may be located in different arrays of MCPEs or coupled by different networks, but the embodiment is not so limited. The three MCPEs 4012-4016 may be located in different regions of a network, but the embodiment is not so limited. Each MCPE 4012-4016 of the data path 4000 is programmable through at least one function port of the MCPE 4012-4016 to efficiently support non-local functions comprising saturated and minimum and maximum arithmetic functions. The minimum and maximum functions are of particular use in digital signal processing (DSP) operations.

In an embodiment comprising three MCPEs 4012-4016, the ALU 4002 of MCPE 4012 serves as the most significant byte (MSB) of the data path 4000 while the ALU 4006 of MCPE 4016 serves as the least significant byte (LSB) of the data path 4000. Carry paths are used to couple the MCPEs 4012-4016 of the data path 4000 in order to chain forward a carry bit and back-propagate configuration signals through the data path 4000. The ALUs 4002-4006 of the data path 4000 are coupled using a left-going, or forward, carry chain 4020 and 4030 for transmitting at least one carry bit from the LSB ALU 4006 through ALU 4004 to the MSB ALU 4002. The MSB ALU 4002 comprises configurable logic for generating at least one signal in response to a carry bit received over the left-going carry chain 4020 and 4030, the at least one signal comprising a saturation signal and a saturation value. The saturation signal is generated using logic that tests for saturation in the data path 4000.

The ALUs 4002-4006 of the data path 4000 are coupled using a right-going carry chain 4022 and 4032 for transmitting the saturation signal back down the data path 4000. In one embodiment, the right-going carry chain 4022 and 4032 comprises two lines coupled among the ALUs 4002-4006 of the data path 4000. The right-going carry chain 4022 and 4032 comprises at least one back propagation channel. The saturation signal is transmitted from the MSB ALU 4002 through all other ALUs 4004 of the data path 4000 to the LSB ALU 4006 using a first back propagation channel. Furthermore, a signal that selects a saturation value is transmitted from the MSB ALU 4002 to the LSB ALU 4006 using a second back propagation channel. Each MCPE 4012-4016 of the data path 4000 uses configurable logic to manipulate a resident bit sequence in response to the saturation signal transmitted thereby reconfiguring the data path 4000 in response to the saturation signal. A programmable delay element may be used in the back propagation channel, but the embodiment is not so limited. The delay element, when used, is configured to programmably delay signals between the multiple context processing elements without requiring a multiple context processing element to implement the delay.

Figure 10:
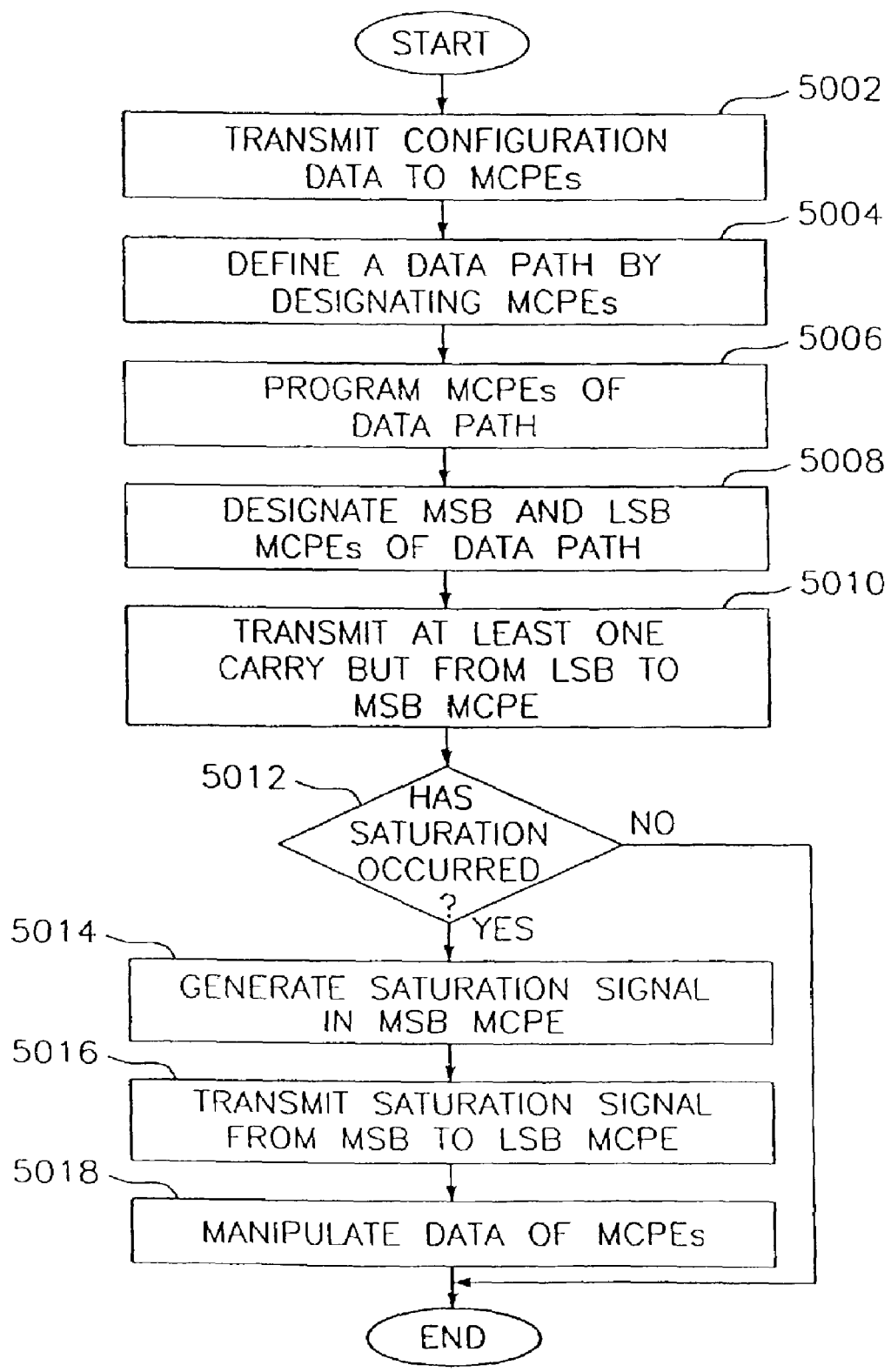
FIG. 10 is a flow diagram of a method for using a data path comprising a number of MCPEs of one embodiment.

FIG. 10 is a flow diagram of a method for using a data path comprising a number of MCPEs of one embodiment. Operation begins at step 5002, at which configuration data is transmitted to a plurality of MCPEs. At least one data path is defined by designating the MCPEs of the data path in response to the configuration data, at step 5004. The MCPEs designated to comprise the data path are programmed, at step 5006, in response to the configuration data. This programming includes identifying to each MCPE of the data path the neighboring MCPEs forming the data path. At step 5008, a flag is set in the MSB and LSB MCPEs in response to the configuration data, the flag of the MSB MCPE designating the MCPE as the MSB, and the flag of the LSB MCPE designating the MCPE as the LSB. At least one carry bit is transmitted from the LSB MCPE to the MSB MCPE, at step 5010 using the left-going carry chain. The MSB MCPE uses logic to test for saturation in the data path, at step 5012.

If no saturation is detected in the data path, then operation ends. If saturation has occurred, operation continues at step 5014, at which at least one signal is generated in the MSB MCPE in response to the received carry bit. The at least one signal comprises a saturation signal and a saturation value. At step 5016, the at least one signal is transmitted from the MSB MCPE through each MCPE of the data path to the LSB MCPE. Each MCPE of the data path uses configurable logic to manipulate a resident bit sequence in response to the at least one signal, thereby reconfiguring the data path, at step 5018. For example, if saturation to positive infinity has occurred, all MCPEs of the data path not the MSB MCPE set all resident bits to a logic one.

The configuration of each MCPE comprises a description of how the MCPE fits into data paths comprising multiple MCPEs, wherein the data paths may be of an arbitrary size and shape. FIG. 11 is the data path configuration data of one embodiment. The LSB configuration, when set to 1, indicates that the MCPE is the least-significant byte of the data path. The MSB configuration, when set to 1, indicates that the MCPE is the most-significant byte of the data path. The RightSource configuration defines the source of the right, or least significant, input carry of the MCPE. The LeftSource configuration defines the source of the left, or most significant, input carry of the MCPE. The CarryPipelineR configuration, when set to 1, inserts a pipeline delay on the right, or least significant, input carry of the MCPE. The CarryPipelineL configuration, when set to 1, inserts a pipeline delay on the left, or most significant, input carry of the MCPE.

Figure 12:
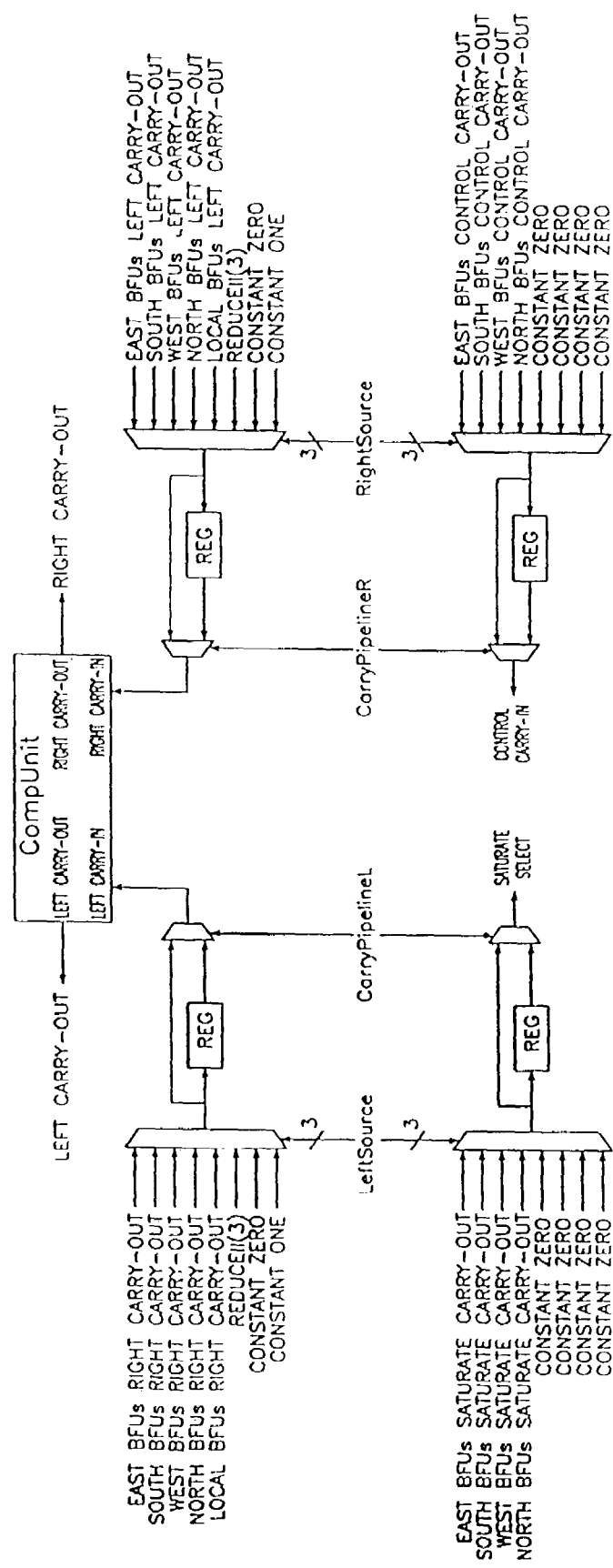
FIG. 12 is the MCPE carry architecture of one embodiment.

FIG. 12 is the MCPE carry architecture of one embodiment. The input carry of the MCPE, in either direction, may come from up to eight sources. FIG. 13 is the carry-in source of one embodiment. These sources include the carry-out from the orthogonally neighboring MCPEs, the carry of the local MCPE, a carry used by MCPE control logic, and a saturate logic carry, but the embodiment is not so limited. The saturate logic carry is used by the saturate logic to indicate whether positive or negative saturation occurred. When the saturate logic carry is set to 1 it indicates that, if saturation occurred, it occurred at positive maxint; when the saturate logic carry is set to 0 it indicates that, if saturation occurred, it occurred at negative maxint, or zero for unsigned numbers. FIG. 14 is the carry value for the operations of one embodiment. The carry value for the operations comprise the output carries of the MCPEs under the specified operations.

When shift operations are conducted using multiple-MCPE data paths, both the LSB and the MSB MCPE affect shift operation; the LSB MCPE affects left shifts and the MSB MCPE affects right shifts. When the appropriate LSB/MSB configuration is not set the shift proceeds normally using the carry-in source specified in the data path configuration (see FIG. 13). However, when the appropriate LSB/MSB configuration is set the carry-in value is set by the ALU function port command (see FIG. 6). In the case where the appropriate LSB/MSB configuration is set the user has the option of using the carry-in source. The MSB controls the saturation point for saturated left shifts.

When addition operations are conducted using multiple-MCPE data paths, the LSB MCPE affects the data path by determining the saturation point for saturated additions. As with multiple-MCPE addition, only the LSB MCPE affects the accumulate operation except that the MSB sets the saturation point.

In performing saturated operations using multiple-MCPE data paths, the data path must be setup such that the left and right carry chains follow the same path, wherein the direction any MCPE transmits a left-going carry-out is the same direction the MCPE looks to receive a right-going carry-in. Saturated operations use the right-going carry chain to back-propagate a saturate/not saturate signal. The back-propagated signal carries a signal that selects the saturation point. The saturation point may be positive or negative infinity in the signed mode, and positive infinity or zero in the unsigned mode. During saturated operations, non-MSB MCPEs pass the carry using the LeftSource inputs of the right-carry outputs. The MSB MCPE tests for the saturation condition and passes a set flag out the right-going carry-out as well as using it to affect the ALUs of the data path. Furthermore, the MSB MCPE generates the second right-going carry.

In performing minimum operations using multiple-MCPE data paths, the data path may be established such that the left and right carry chains follow the same path. The minimum operation uses the right-going carry chain to back-propagate an A/B selection signal. The non-MSB MCPEs pass the minimum signal from the LeftSource to the right-going carry-out, while the MSB MCPE generates the minimum signal and passes it out the right-going carry-out.

The MCPEs of one embodiment are the building blocks out of which more complex processing structures may be created. The structure that joins the MCPE cores into a complete array in one embodiment is actually a set of several mesh-like interconnect structures. Each interconnect structure forms a network, and each network is independent in that it uses different paths, but the networks do join at the MCPE input switches. The network structure of one embodiment of the present invention is comprised of a local area broadcast network (level 1), a switched interconnect network (level 2), a shared bus network (level 3), and a broadcast, or configuration, network.

Figure 15:
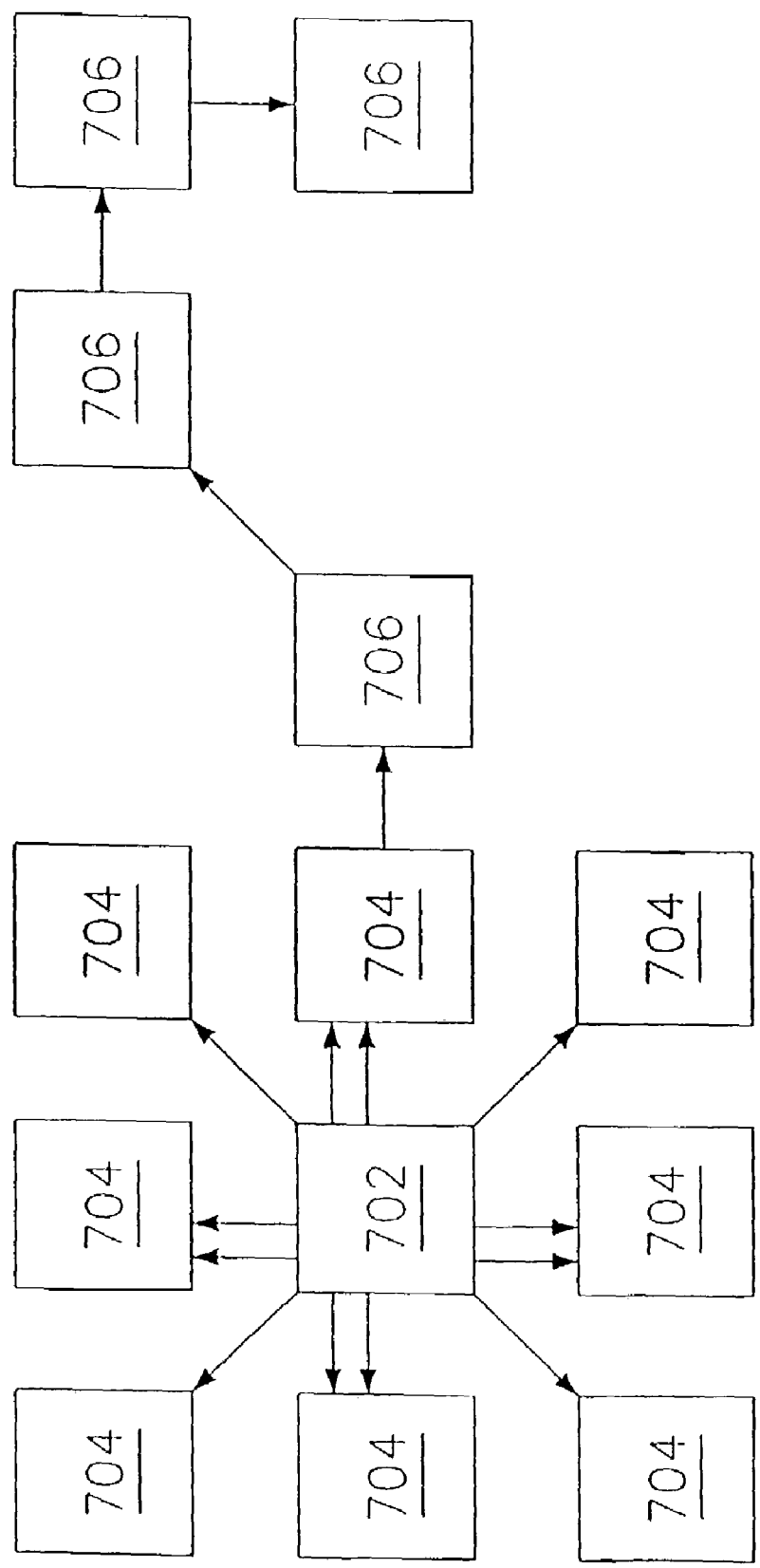
FIG. 15 is the level 1 network of one embodiment.

FIG. 15 is the level 1 network of one embodiment. The level 1 network, or bit-wide local interconnect, consists of direct point-to-point communications between each MCPE 702 and the eight nearest neighbors 704. Each MCPE 702 can output up to 12 values comprising two in each of the orthogonal directions, and one in each diagonal. The level 1 network carries bit-oriented control signals between these local groups of MCPEs. The connections of level 1 only travel one MCPE away, but the values can be routed through the level 1 switched mesh structure to other MCPEs 706. Each connection consists of a separate input and output wire. Configuration for this network is stored along with MCPE configuration.

Figure 16:
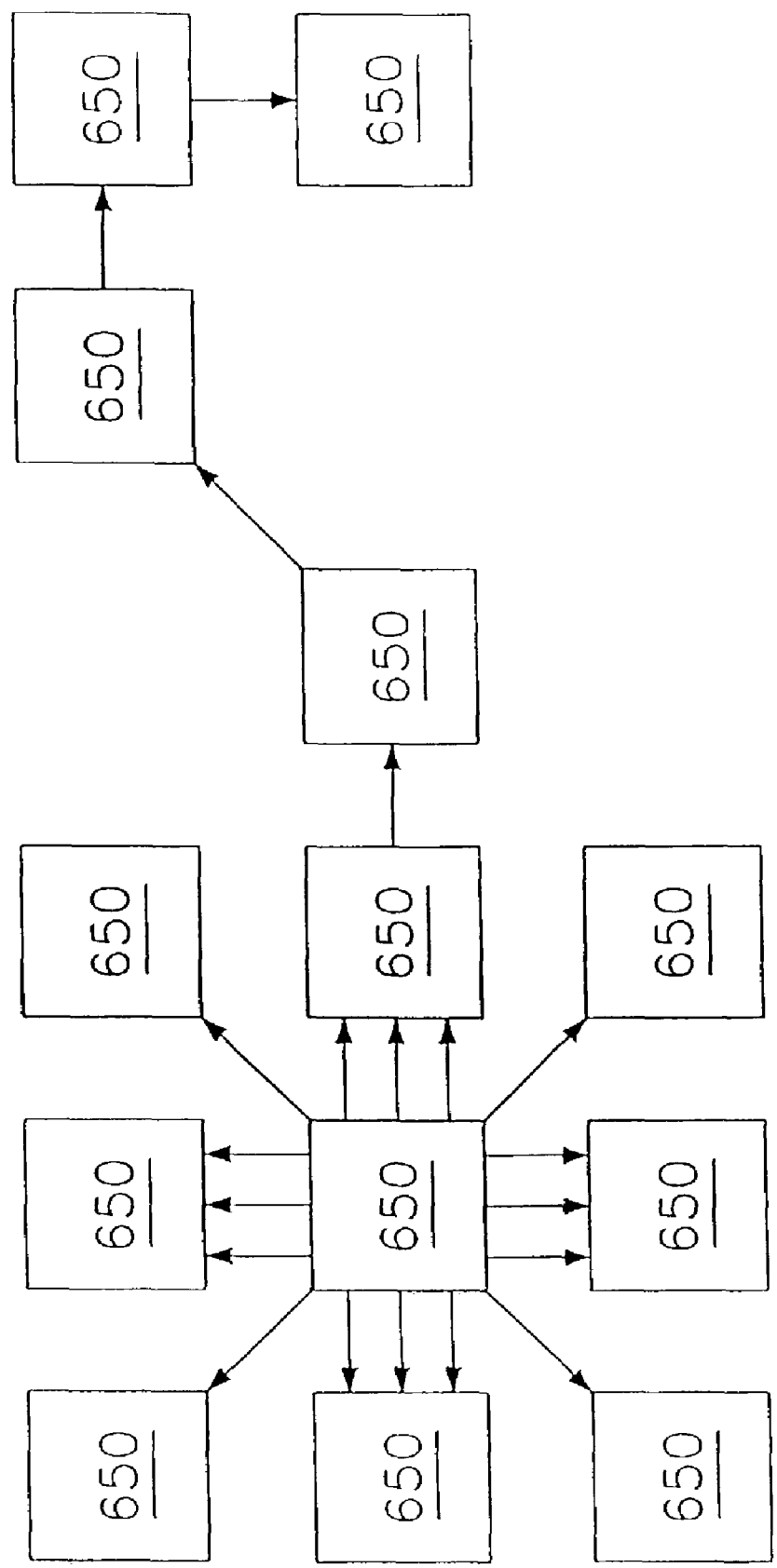
FIG. 16 is the level 2 network of one embodiment.

FIG. 16 is the level 2 network of one embodiment. The level 2 network, or byte-wide local interconnect, is used to carry data, instructions, or addresses in local groups of MCPEs 650. It is a byte-wide version of level 1 having additional connections. This level uses relatively short wires linked through a set of switches. The level 2 network is the primary means of local and semi-local MCPE communication, and level 2 does require routing. Using the level 2 network each MCPE 650 can output up to 16 values, at least two in each of the orthogonal directions and at least one in each diagonal. Each connection consists of separate input and output wires. These connections only travel one MCPE away, but the values can be routed through level 2 switches to other MCPEs. Preferably configuration for this network is also stored along with MCPE configuration.

Figure 17:
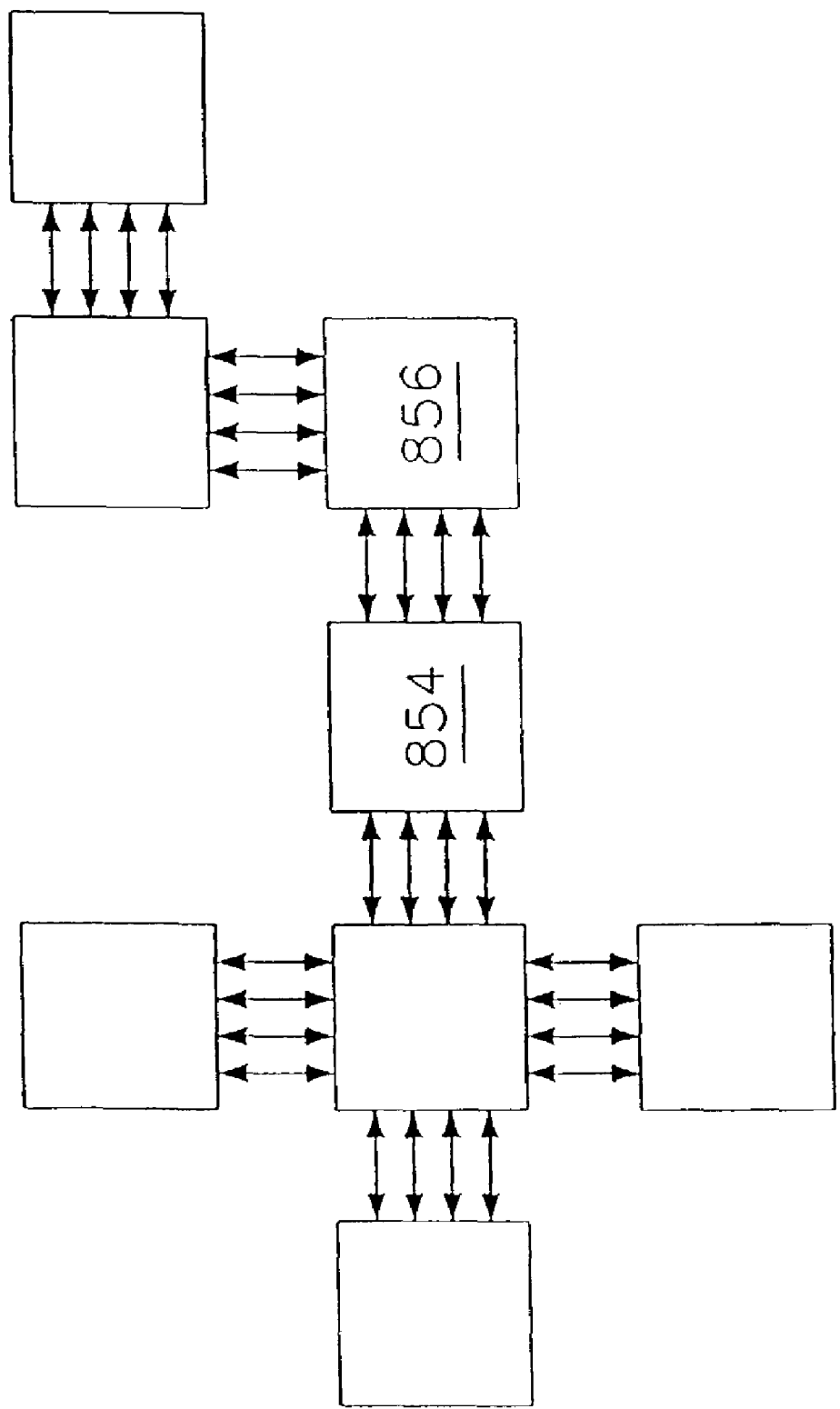
FIG. 17 is the level 3 network of one embodiment.

FIG. 17 is the level 3 network of one embodiment. In this one embodiment, the level 3 network comprises connections 852 of four channels between each pair of MCPEs 854 and 856 arranged along the major axes of the MCPE array providing for communication of data, instructions, and addresses between groups of MCPEs and between MCPEs and the perimeter of the chip. Preferably communication using the level 3 network is bi-directional and dynamically routable. A connection between two endpoints through a series of level 3 array and periphery nodes is called a Acircuit@ and may be set up and taken down by the configuration network. In one embodiment, each connection 852 consists of an 8-bit bi-directional port.

Figure 18:
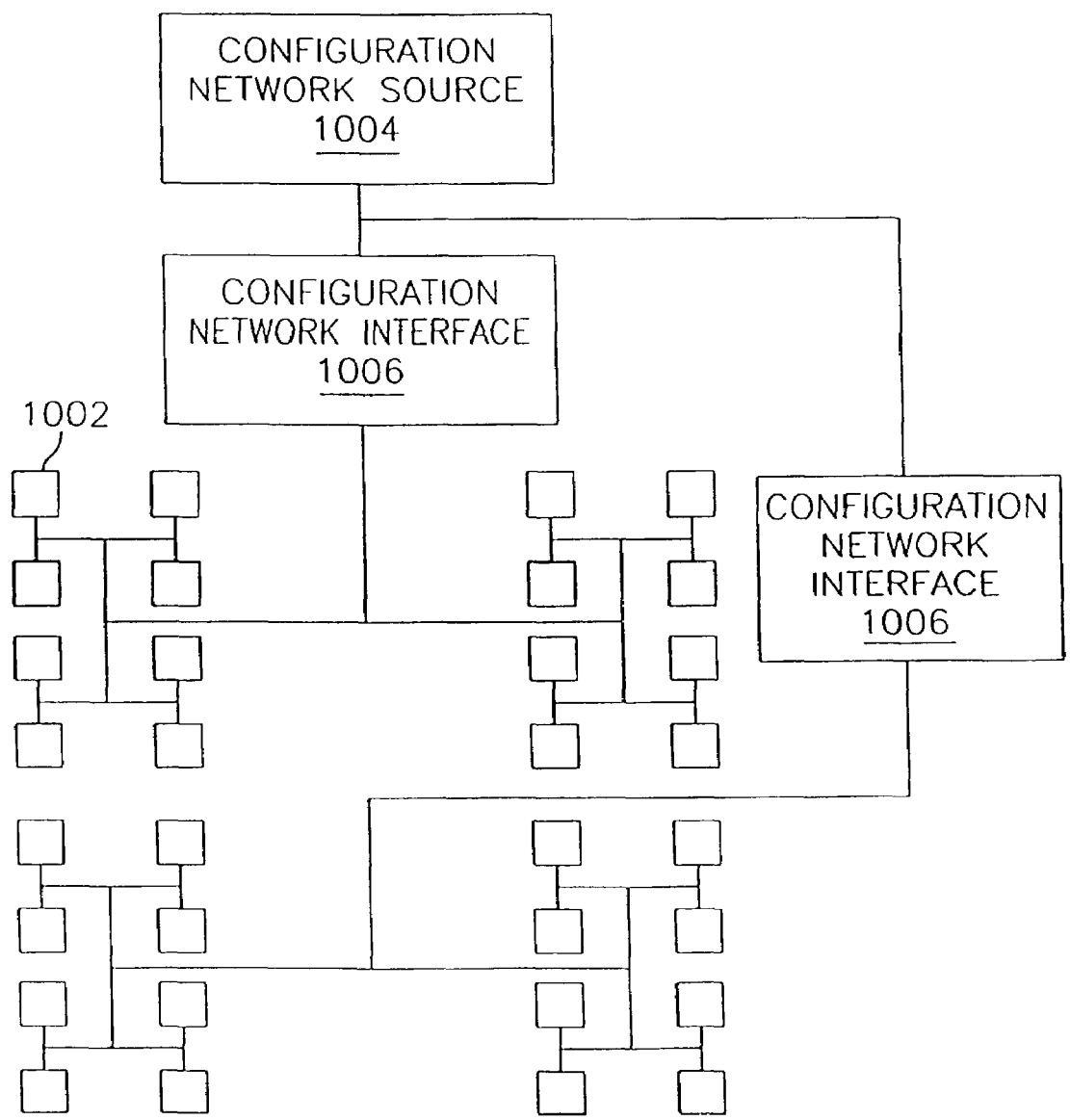
FIG. 18 is the broadcast, or configuration, network used in one embodiment.

FIG. 18 is the broadcast, or configuration, network used in one embodiment. This broadcast network is an H-tree network structure with a single source and multiple receivers in which individual MCPEs 1002 may be written to. This broadcast network is the mechanism by which configuration memories of both the MCPEs and the perimeter units get programmed. The broadcast network may also be used to communicate the configuration data for the level 3 network drivers and switches.

The broadcast network in one embodiment comprises a nine bit broadcast channel that is structured to both program and control the on-chip MCPE 1002 configuration memories. The broadcast network comprises a central source, or Configuration Network Source (CNS) 1004, and one Configuration Network Interface (CNI) block 1006 for each major component, or one in each MCPE with others assigned to individual or groups of non-MCPE blocks. The CNI 1006 comprises a hardwired finite state machine, several state registers, and an eight bit loadable clearable counter used to maintain timing. The CNS 1004 broadcasts to the CNIs 1006 on the chip according to a specific protocol. The network is arranged so that the CNIs 1006 of one embodiment receive the broadcast within the same clock cycle. This allows the broadcast network to be used as a global synchronization mechanism as it has a fixed latency to all parts of the chip. Therefore, the broadcast network functions primarily to program the level 3 network, and to prepare receiving CNIs for configuration transactions. Typically, the bulk of configuration data is carried over the level 3 network, however the broadcast network can also serve that function. The broadcast network has overriding authority over any other programmable action on the chip.

A CNI block is the receiving end of the broadcast network. Each CNI has two addresses: a physical, hardwired address and a virtual, programmable address. The latter can be used with a broadcast mask, discussed herein, that allows multiple CNIs to receive the same control and programming signals. A single CNI is associated with each MCPE in the networked MCPE array. This CNI controls the reading and writing of the configuration of the MCPE contexts, the MCPE main memory, and the MCPE configuration controller.

The CNS 1004 broadcasts a data stream to the CNIs 1006 that comprises the data necessary to configure the MCPEs 1002. In one embodiment, this data comprises configuration data, address mask data, and destination identification data. FIG. 19 is the encoding of the configuration byte stream as received by the CNI in one embodiment. The first four bytes are a combination of mask and address where both mask and address are 15 bit values. The address bits are only tested when the corresponding mask is set to A1@. The high bit of the Address High Byte is a Virtual/Physical identification selection. When set to A1@, the masked address is compared to the MCPE virtual, or programmable, identification; when set to A0@ the masked address is compared to the MCPE physical address. This address scheme applies to a CNI block whether or not it is in an MCPE.

Following the masked address is a command/context byte which specifies which memory will be read from or written to by the byte stream. FIG. 20 is the encoding of the command/context byte in one embodiment. Following the command/context byte is a byte-count value. The byte count indicates the number of bytes that will follow.

Figure 21:
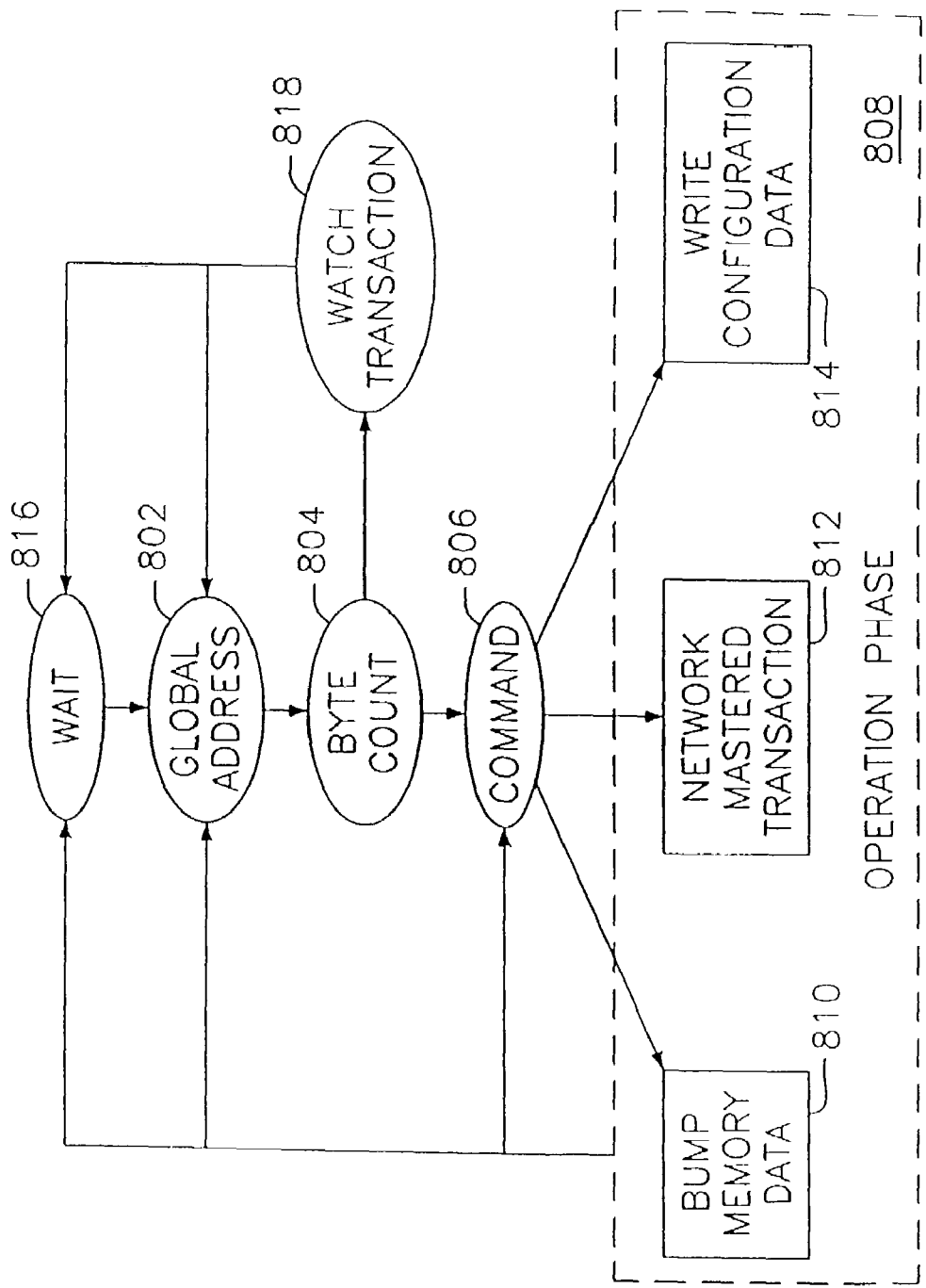
FIG. 21 is a flowchart of a broadcast network transaction.

As previously discussed, the CNS 1004 broadcasts a data stream to the CNIs 1006 that comprises the data necessary to configure the MCPEs 1002. In one embodiment, this data comprises configuration data, address mask data, and destination identification data. A configuration network protocol defines the transactions on the broadcast network. FIG. 21 is a flowchart 800 of one embodiment of a broadcast network transaction. In this embodiment, a transaction can contain four phases: global address 802, byte count 804, command 806, and operation 808. The command 806 and operation 808 phases may be repeated as much as desired within a single transaction.

The global address phase 802 is used to select a particular receiver or receivers, or CNI blocks, and all transactions of an embodiment begin with the global address phase 802. This phase 802 comprises two modes, a physical address mode and a virtual address mode, selected, for example, using a prespecified bit of a prespecified byte of the transaction. The physical address mode allows the broadcast network to select individual CNIs based on hardwired unique identifiers. The virtual address mode is used to address a single or multiple CNIs by a programmable identifier thereby allowing the software to design its own address space. At the end of the global address phase 802, the CNIs know whether they have been selected or not.

Following the global address phase 802, a byte count 804 of the transaction is transmitted so as to allow both selected and unselected CNIs to determine when the transaction ends. The selected CNIs enter the command phase 806; the CNIs not selected watch the transaction 818 and wait 816 for the duration of the byte count. It is contemplated that other processes for determining the end of a transaction may also be used.

During the command phase 806, the selected CNIs can be instructed to write the data on the next phase into a particular context, configuration, or main memory (write configuration data 814), to listen to the addresses, commands and data coming over the network (network mastered transaction 812), or to dump the memory data on to a network output (dump memory data 810). Following the command phase 806, the data is transmitted during the operation phase 808.

The network mastered transaction mode 812 included in the present embodiment commands the CNI to look at the data on the output of the level 3 network. This mode allows multiple configuration processes to take place in parallel. For example, a level 3 connection can be established between an off-chip memory, or configuration storage, and a group of MCPEs and the MCPEs all commanded to enter the network mastered mode. This allows those MCPEs to be configured, while the broadcast network can be used to configure other MCPEs or establish additional level 3 connections to other MCPEs.

Following completion of the operation phase 808, the transaction may issue a new command, or it can end. If it ends, it can immediately be followed by a new transaction. If the byte count of the transaction has been completed, the transaction ends. Otherwise, the next byte is assumed to be a new command byte.

Figure 22:
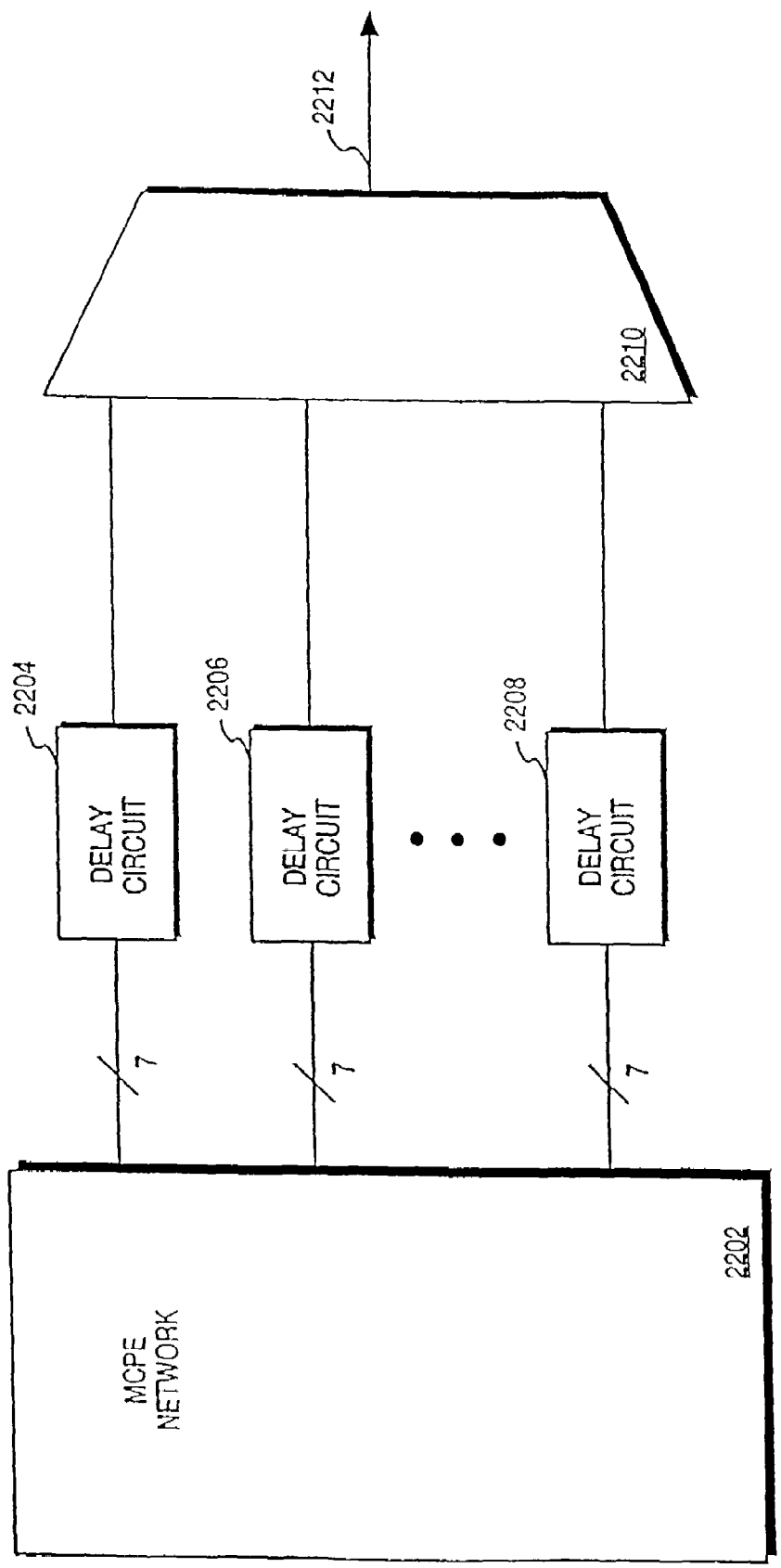
FIG. 22 is the MCPE networked array with delay circuits of one embodiment.

Pipeline delays can be programmed into the network structure as they are needed. These delays are separate from the networked array of MCPEs and provide data-dependent retiming under the control of the configuration memory context of a MCPE, but do not require an MCPE to implement the delay. In this way, processing elements are not wasted in order to provide timing delays. FIG. 22 is the MCPE networked array 2202 with delay circuits 2204-2208 of one embodiment. The subsets of the outputs of the MCPE array 2202 are coupled to the inputs of a number of delay circuits 2204-2208. In this configuration, a subset comprising seven MCPE outputs share each delay circuit, but the configuration is not so limited. The outputs of the delay circuits 2204-2208 are coupled to a multiplexer 2210 that multiplexes the delay circuit outputs to a system output 2212. In this manner, the pipeline delays can be selectively programmed for the output of each MCPE of the network of MCPEs. The configuration memory structure and local control described herein are shared between the MCPEs and the delay circuit structure.

Figure 23:
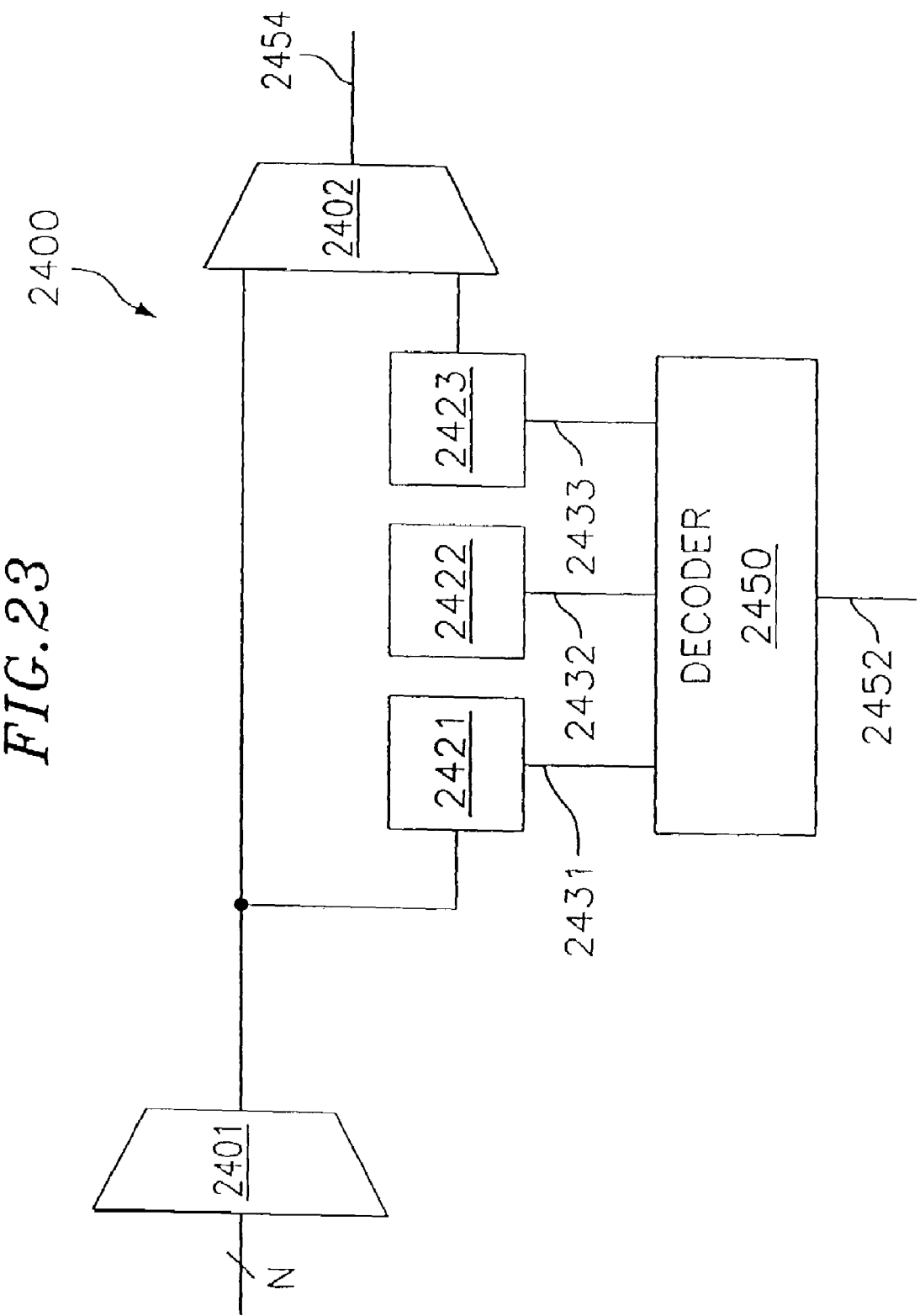
FIG. 23 is a delay circuit of one embodiment.

FIG. 23 is a delay circuit 2400 of one embodiment. This circuit comprises three delay latches 2421-2423, a decoder 2450, and two multiplexers 2401-2402, but is not so limited. Some number N of MCPE outputs of a network of MCPEs are multiplexed into the delay circuit 2400 using a first multiplexer 2401. The output of a MCPE selected by the first multiplexer 2401 is coupled to a second multiplexer 2402 and to the input of a first delay latch 2421. The output of the first delay latch 2421 is coupled to the input of a second delay latch 2422. The output of the second delay latch 2422 is coupled to the input of a third delay latch 2423. The output of the third delay latch 2423 is coupled to an input of the second multiplexer 2402. The output of the second multiplexer 2402 is the delay circuit output. A decoder 2450 selectively activates the delay latches 2421-2423 via lines 2431-2433, respectively, thereby providing the desired amount of delay. The decoder is coupled to receive via line 2452 at least one set of data representative of at least one configuration memory context of a MCPE and control latches 2421-2423 in response thereto. The MCPE having it=s output coupled to the delay circuit 2400 by the first multiplexer 2402 may be the MCPE that is currently selectively coupled to the decoder 2450 via line 2452, but is not so limited. In an alternate embodiment, the MCPE receiving the output 2454 of the delay circuit 2400 from the second multiplexer 2402 may be the MCPE that is currently selectively coupled to the decoder 2450 via line 2452, but is not so limited.

Figure 24:
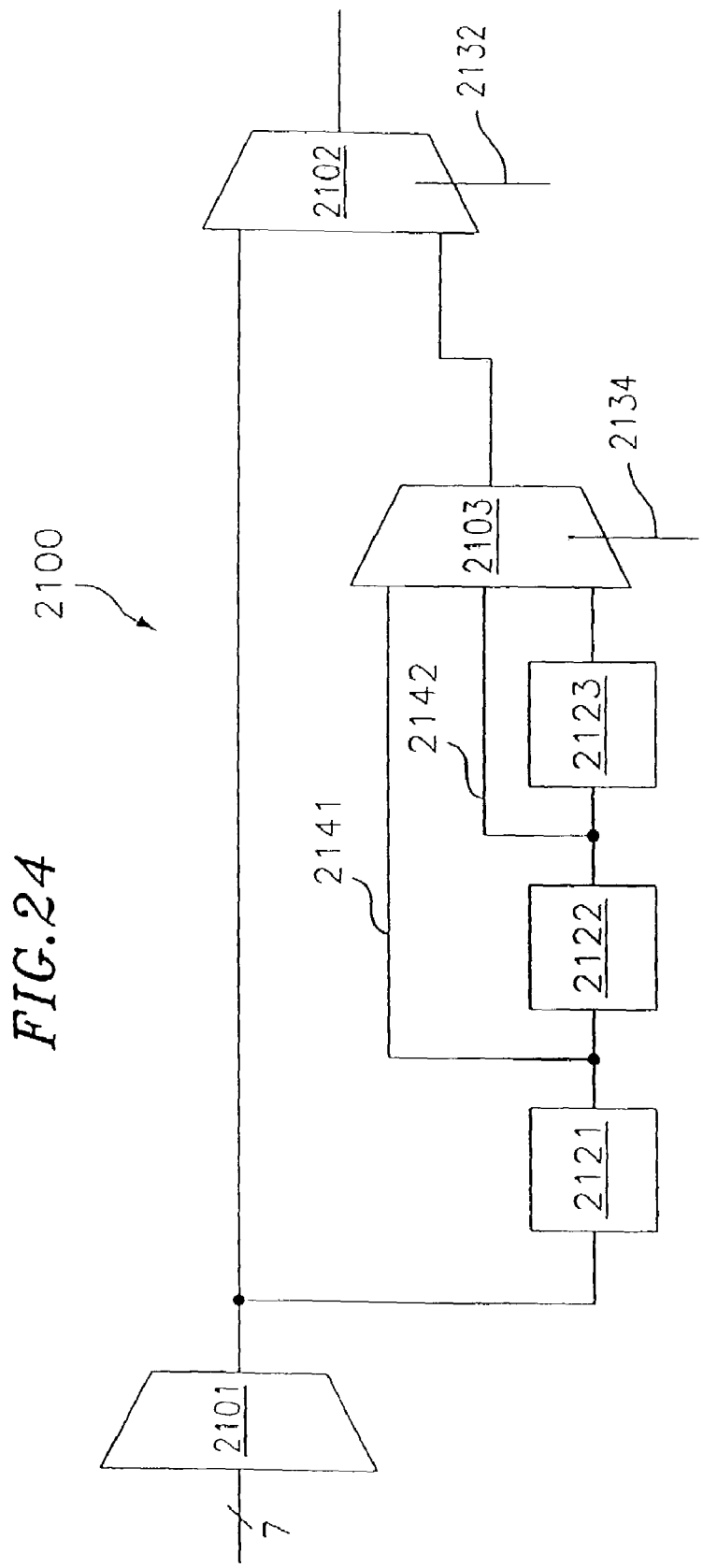
FIG. 24 is a delay circuit of an alternate embodiment.

FIG. 24 is a delay circuit 2100 of an alternate embodiment. This circuit comprises three delay registers 2121-2123 and three multiplexers 2101-2103, but is not so limited. Several outputs of a network of MCPEs are multiplexed into the delay circuit 2100 using a first multiplexer 2101. The output of a MCPE selected by the first multiplexer 2101 is coupled to a second multiplexer 2102 and the input of a first delay register 2121. The output of the first delay register 2121 is coupled to an input of a third multiplexer 2103 and the input of a second delay register 2122. The output of the second delay register 2122 is coupled to an input of the third multiplexer 2103 and the input of a third delay register 2123. The output of the third delay register 2123 is coupled to an input of the third multiplexer 2103. The output of the third multiplexer 2103 is coupled to an input of the second multiplexer 2102, and the output of the second multiplexer 2102 is the delay circuit output.

Each of the second and third multiplexers 2102 and 2103 are coupled to receive via lines 2132 and 2134, respectively, at least one set of data representative of at least one configuration memory context of a MCPE. Consequently, the MCPE coupled to control the second and third multiplexers 2102 and 2104 may be the MCPE that is currently selectively coupled to the delay circuit 2100 by multiplexer 2101, but is not so limited. The control bits provided to multiplexer 2102 cause multiplexer 2102 to select the undelayed output of multiplexer 2101 or the delayed output of multiplexer 2103. The control bits provided to multiplexer 2103 cause multiplexer 2103 to select a signal having a delay of a particular duration. When multiplexer 2103 is caused to select line 2141 then the delay duration is that provided by one delay register, delay register 2121. When multiplexer 2103 is caused to select line 2142 then the delay duration is that provided by two delay registers, delay registers 2121 and 2122. When multiplexer 2103 is caused to select line 2143 then the delay duration is that provided by three delay registers, delay registers 2121, 2122, and 2123.

Figure 25:
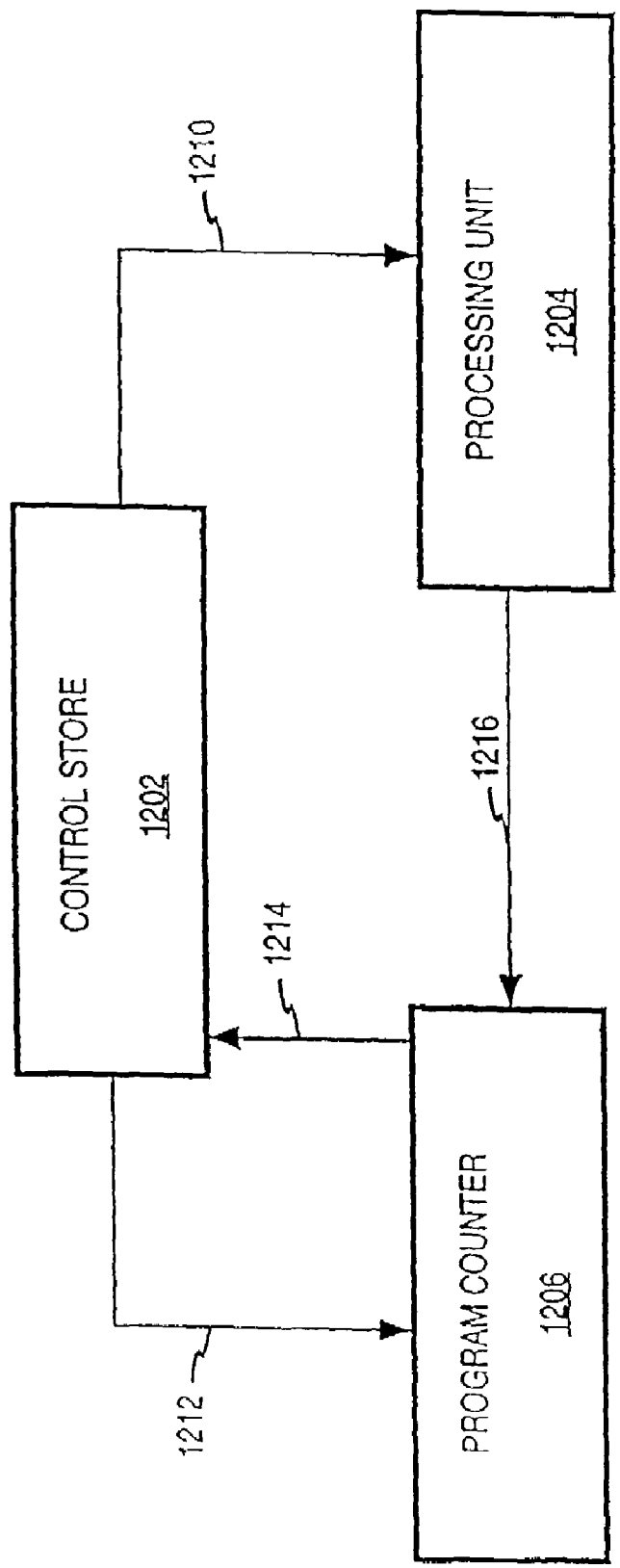
FIG. 25 is a processing element (PE) architecture which is a simplified version of the MCPE architecture of one embodiment.

The control logic of the MCPE of one embodiment is designed to allow data dependent changes in the MCPE operation. It does so by changing the MCPE configuration contexts which in turn change the MCPE functionality. In order to describe the use of configuration contexts, an architecture is described to which they apply. FIG. 25 is a processing element (PE) architecture which is a simplified version of the MCPE architecture of one embodiment. In this PE architecture, each PE has three input ports: the ALU port; the Data port; and the External control port. The control store 1202 is sending the processing unit 1204 microcode instructions 1210 and the program counter 1206 jump targets 1212. The control store 1202 takes the address of its next microcode instruction 1214 from the program counter 1206. The processing unit 1204 is taking the instructions 1210 from the control store 1202, as well as data not shown, and is performing the microcoded operations on that data. One of the results of this operation is the production of a control signal 1216 that is sent to the program counter 1206. The program counter 1206 performs one of two operations, depending on the value of the control signal from the processing unit 1204. It either adds one to the present value of the program counter 1206, or it loads the program counter 1206 with the value provided by the control store 1202.

The ports in each PE can either be set to a constant value or be set to receive their values from another PE. When the port is set to load the value from another PE it is said to be in a static mode. Each PE has a register file and the value presented at the ALU control port can instruct the PE to increment an element in its register file or load an element in its register file from the data port. The state of each port then is comprised by its port mode, which is constant or static. If the port mode is constant then its state also includes the constant value.

The PEs have multiple contexts. These contexts define the port state for each port. The PEs also have a finite state machine (FSM) that is described as a two index table that takes the current context as the first index and the control port as the second index. For this example, assume that there are two contexts, 0 and 1, and there are two values to the control signal 0 and 1.

Now considered is the creation of the program counter 1206 from the PEs. The definition of the context 0 for the program counter 1206 is that the ALU control port is set to a constant value such that the PE will increment its first register. The state of the data port is static and set to input the branch target output from the control store 1202. The state of the control port is static and set to input the control output from the processing unit 1204. The definition of context 1 is that the ALU control port is set to a constant value such that the PE will load its first register with the value of the data port. The state of the data port is static and set to input the branch target output from the control store 1202. The state of the control port is static and set to input the control output from the processing unit 1204. In all contexts the unit is sending the value of its first register to the control store as its next address.

Now considered is the operation of this PE unit. The PE is placed into context 0 upon receiving a 0 control signal from the processing unit 1204. In this context it increments its first register so that the address of the next microcode instruction is the address following the one of the present instruction. When the PE receives a 1 control signal from the processing unit it is placed in context 1. In this context it loads its first register with the value received on the data port. This PE is therefore using the context and the FSM to vary its function at run time and thereby perform a relatively complex function.

Figure 26:
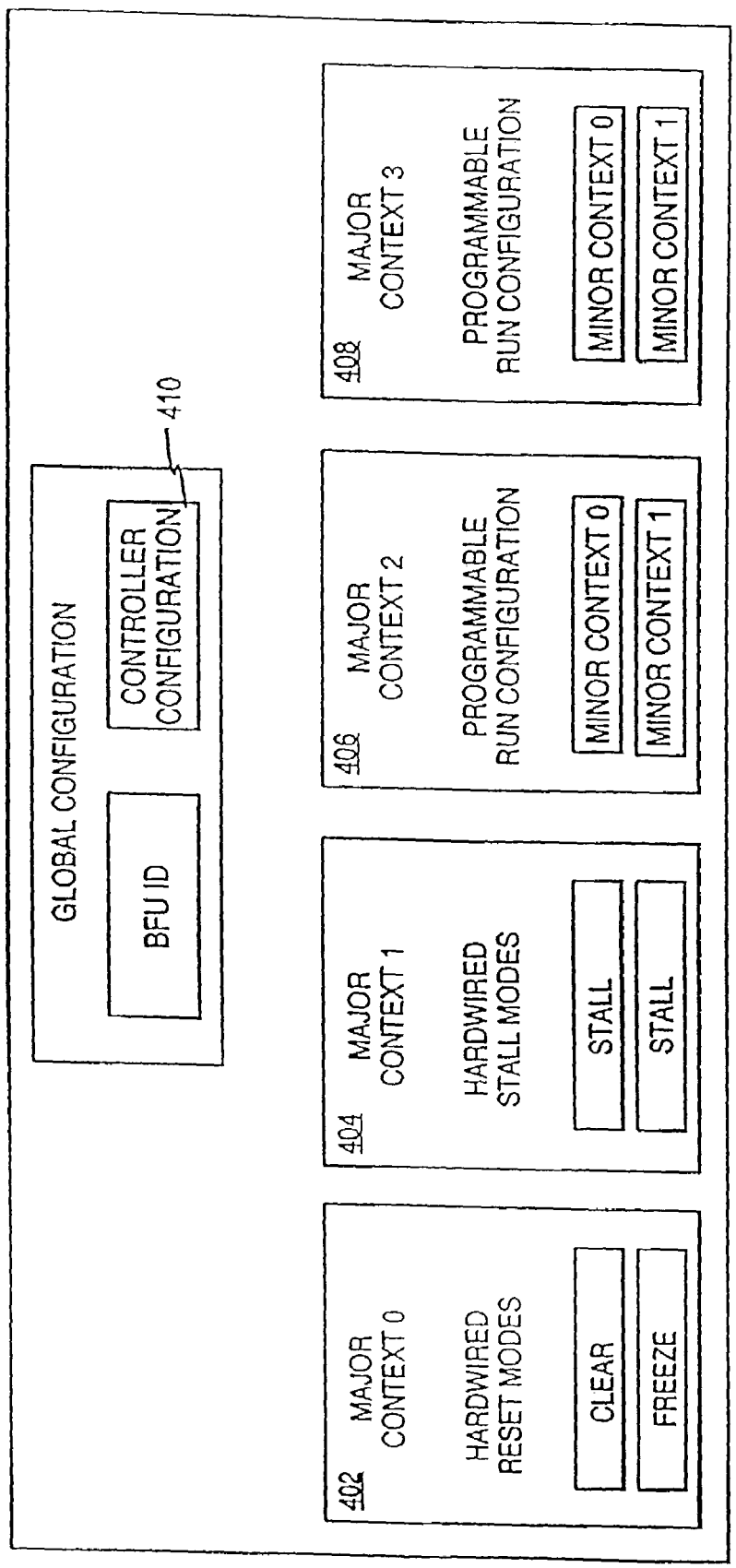
FIG. 26 is the MCPE configuration memory structure of one embodiment.

FIG. 26 is the MCPE configuration memory structure of one embodiment. Each MCPE has four major contexts 402-408 of configuration memory. Each context contains a complete set of data to fully describe the operation of the MCPE, including the local network switching. In one embodiment two of the contexts are hardwired and two are programmable. Each of these contexts includes two independently writable minor contexts. In the programmable major contexts the minor contexts are a duplication of part of the MCPE configuration consisting primarily of the port configurations. In the hardwired major contexts the minor contexts may change more than just the port configurations. The switching of these minor contexts is also controlled by the configuration control. The minor contexts are identical in structure but contain different run-time configurations. This allows a greater degree of configuration flexibility because it is possible to dynamically swap some parts of the configuration without requiring memories to store extra major contexts. These minor contexts allow extra flexibility for important parts of the configuration while saving the extra memory available for those parts that don=t need to be as flexible. A configuration controller 410 finite state machine (FSM) determines which context is active on each cycle. Furthermore, a global configuration network can force the FSM to change contexts.

The first two major contexts (0 and 1) may be hardwired, or set during the design of the chip, although they are not so limited. Major context 0 is a reset state that serves two primary roles depending on the minor context. Major context 1 is a local stall mode. When a MCPE is placed into major context 1 it continues to use the configuration setting of the last non-context 1 cycle and all internal registers are frozen. This mode allows running programs to stall as a freeze state in which no operations occur but allows programming and scan chain readout, for debugging, to occur.

Minor context 0 is a clear mode. Minor context 0 resets all MCPE registers to zero, and serves as the primary reset mode of the chip. Minor context 0 also freezes the MCPE but leaves the main memory active to be read and written over by the configuration network.

Minor context 1 is a freeze mode. In this mode the internal MCPE registers are frozen while holding their last stored value; this includes the finite state machine state register. This mode can be used as a way to turn off MCPE=s that are not in use or as a reset state. Minor context 1 is useful to avoid unnecessary power consumption in unused MCPEs because the memory enable is turned off during this mode.

Major contexts 2 and 3 are programmable contexts for user defined operations. In addition to the four major contexts the MCPE contains some configurations that do not switch under the control of the configuration controller. These include the MCPE=s identification number and the configuration for the controller itself.

Figure 27:
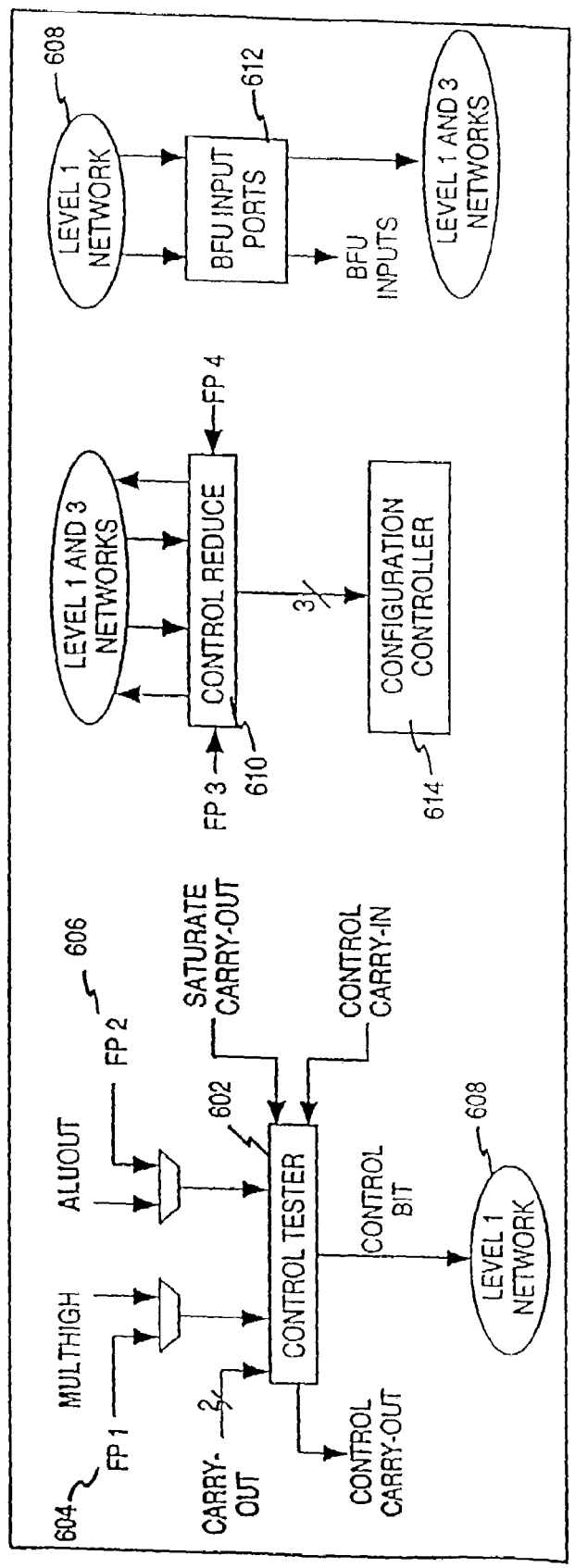
FIG. 27 shows the major components of the MCPE control logic structure of one embodiment.

FIG. 27 shows the major components of the MCPE control logic structure of one embodiment. The Control Tester 602 takes the output of the ALU for two bytes from floating ports 604 and 606, plus the left and right carryout bits, and performs a configurable test on them. The result is one bit indicating that the comparison matched. This bit is referred to as the control bit. This Control Tester serves two main purposes. First it acts as a programmable condition code generator testing the ALU output for any condition that the application needs to test for. Secondly, since these control bits can be grouped and sent out across the level 2 and 3 networks, this unit can be used to perform a second or later stage reduction on a set of control bits/data generated by other MCPE=s.

The level 1 network 608 carries the control bits. As previously discussed, the level 1 network 608 consists of direct point-to-point communications between every MCPE and it=s 12 nearest neighbors. Thus, each MCPE will receive 13 control bits (12 neighbors and it=s own) from the level 1 network. These 13 control bits are fed into the Control Reduce block 610 and the MCPE input ports 612. The Control Reduce block 610 allows the control information to rapidly effect neighboring MCPEs. The MCPE input ports allow the application to send the control data across the normal network wires so they can cover long distances. In addition the control bits can be fed into MCPEs so they can be manipulated as normal data.

The Control Reduce block 610 performs a simple selection on either the control words coming from the level 1 control network, the level 3 network, or two of the floating ports. The selection control is part of the MCPE configuration. The Control Reduce block 610 selection results in the output of five bits. Two of the output bits are fed into the MCPE configuration controller 614. One output bit is made available to the level 1 network, and one output bit is made available to the level 3 network.

The MCPE configuration controller 614 selects on a cycle-by-cycle basis which context, major or minor, will control the MCPE=s activities. The controller consists of a finite state machine (FSM) that is an active controller and not just a lookup table. The FSM allows a combination of local and global control over time that changes. This means that an application may run for a period based on the local control of the FSM while receiving global control signals that reconfigure the MCPE, or a block of MCPEs, to perform different functions during the next clock cycle. The FSM provides for local configuration and control by locally maintaining a current configuration context for control of the MCPE. The FSM provides for global configuration and control by providing the ability to multiplex and change between different configuration contexts of the MCPE on each different clock cycle in response to signals broadcasted over a network. This configuration and control of the MCPE is powerful because it allows an MCPE to maintain control during each clock cycle based on a locally maintained configuration context while providing for concurrent global on-the-fly reconfiguration of each MCPE. This architecture significantly changes the area impact and characterization of an MCPE array while increasing the efficiency of the array without wasting other MCPEs to perform the configuration and control functions.

Figure 28:
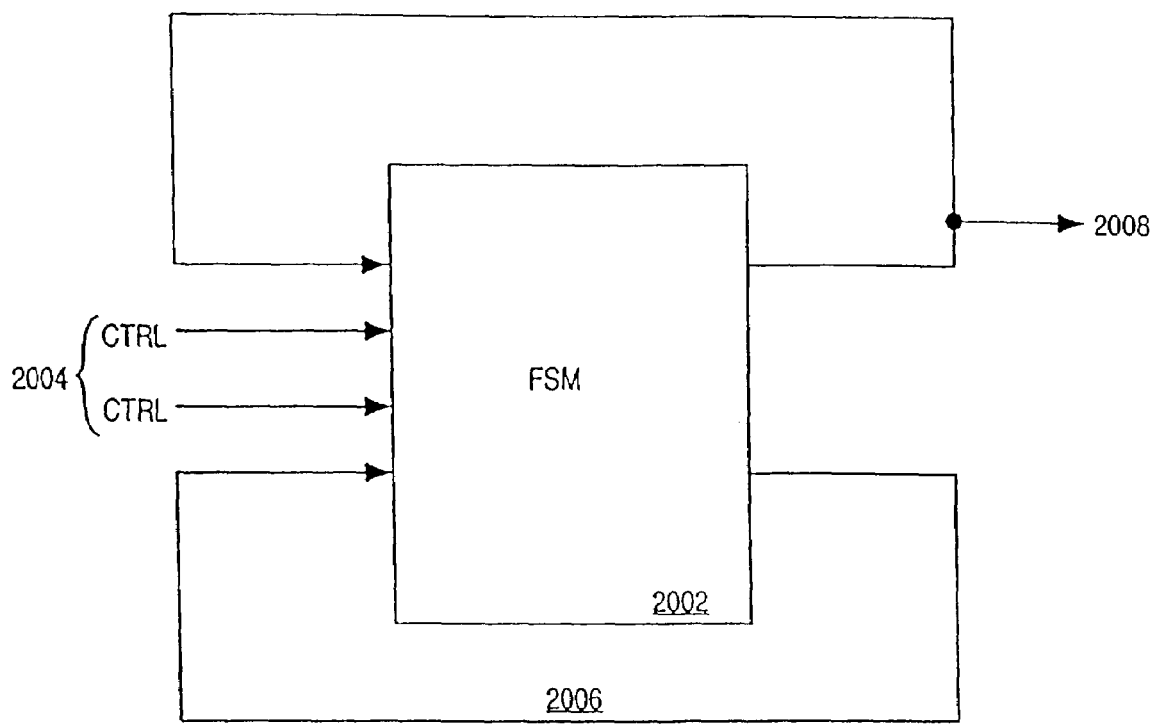
FIG. 28 is the FSM of the MCPE configuration controller of one embodiment.

FIG. 28 is the FSM of the MCPE configuration controller of one embodiment. In controlling the functioning of the MCPE, control information 2004 is received by the FSM 2002 in the form of state information from at least one surrounding MCPE in the networked array. This control information is in the form of two bits received from the Control Reduce block of the MCPE control logic structure. In one embodiment, the FSM also has three state bits that directly control the major and minor configuration contexts for the particular MCPE. The FSM maintains the data of the current MCPE configuration by using a feedback path 2006 to feed back the current configuration state of the MCPE of the most recent clock cycle. The feedback path 2006 is not limited to a single path. The FSM selects one of the available configuration memory contexts for use by the corresponding MCPE during the next clock cycle in response to the received state information from the surrounding MCPEs and the current configuration data. This selection is output from the FSM in the form of a configuration control signal 2008. The selection of a configuration memory context for use during the next clock cycle occurs, in one embodiment, during the execution of the configuration memory context selected for the current clock cycle.

Figure 29:
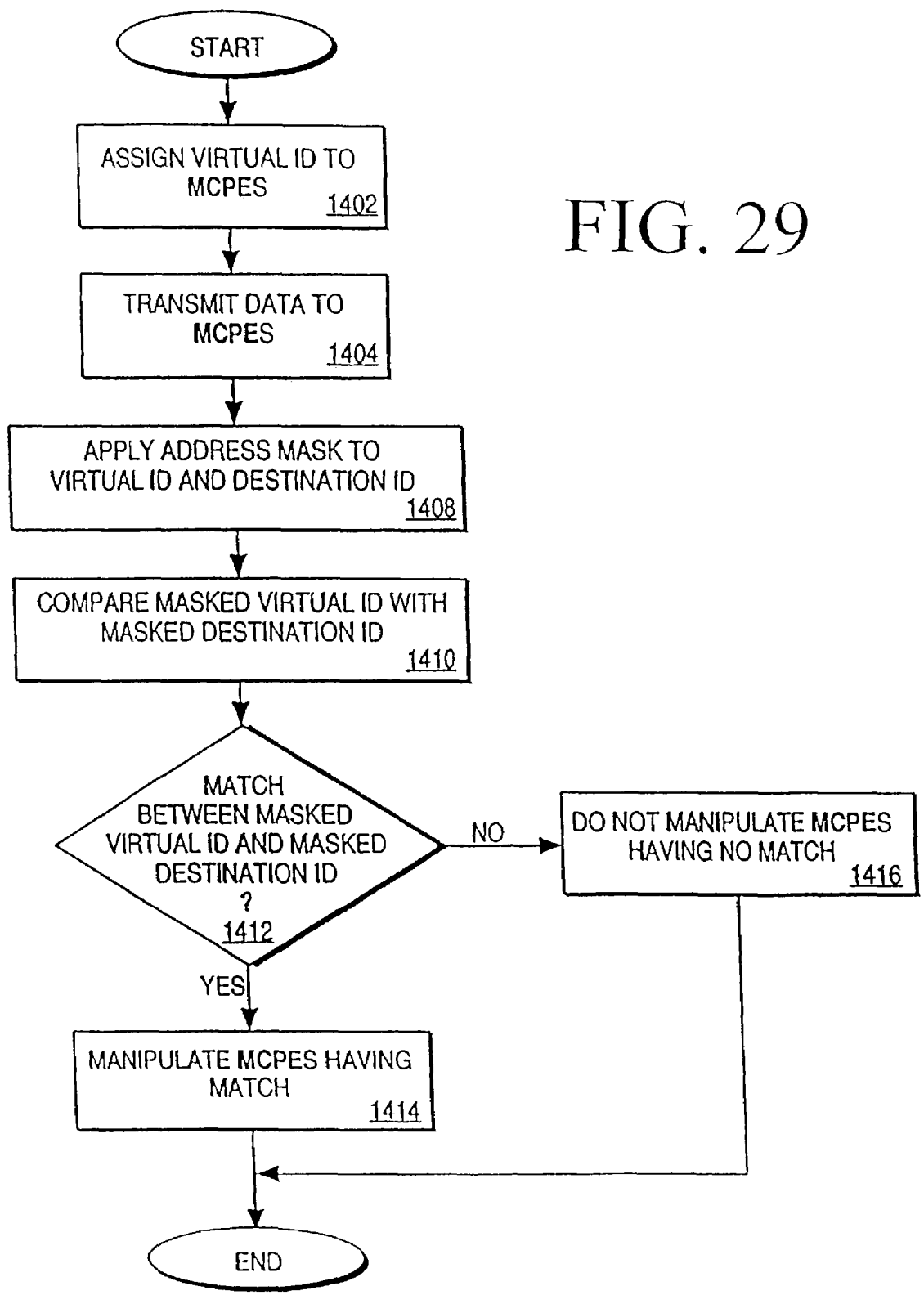
FIG. 29 is a flowchart for manipulating a networked array of MCPEs in one embodiment.

FIG. 29 is a flowchart for manipulating a networked array of MCPEs in one embodiment. Each MCPE of the networked array is assigned a physical identification which, in one embodiment, is assigned at the time of network development. This physical identification may be based on the MCPE=s physical location in the networked array. Operation begins at block 1402, at which a virtual identification is assigned to each of the MCPEs of the array. The physical identification is used to address the MCPEs for reprogramming of the virtual identification because the physical identification is accessible to the programmer. The assigned virtual identification may be initialized to be the same as the physical identification. Data is transmitted to the MCPE array using the broadcast, or configuration, network, at block 1404. The transmitted data comprises an address mask, a destination identification, MCPE configuration data, and MCPE control data. The transmitted data also may be used in selecting between the use of the physical identification and the virtual identification in selecting MCPEs for manipulation. Furthermore, the transmitted data may be used to change the virtual identification of the MCPEs. The transmitted data in one embodiment is transmitted from another MCPE. In an alternate embodiment, the transmitted data is transmitted from an input/output device. In another alternate embodiment, the transmitted data is transmitted from an MCPE configuration controller. The transmitted data may also be transmitted from multiple sources at the same time.

The address mask is applied, at block 1408, to the virtual identification of each MCPE and to the transmitted destination identification. The masked virtual identification of each MCPE is compared to the masked destination identification, at block 1410, using a comparison circuit. When a match is determined between the masked virtual identification of a MCPE and the masked destination identification, at block 1412, the MCPE is manipulated in response to the transmitted data, at block 1414. The manipulation is performed using a manipulation circuit. When no match is determined between the masked virtual identification of a MCPE, at block 1412, the MCPE is not manipulated in response to transmitted data, at block 1416. In one embodiment, a MCPE comprises the comparison circuit and the manipulation circuit.

Figure 30:
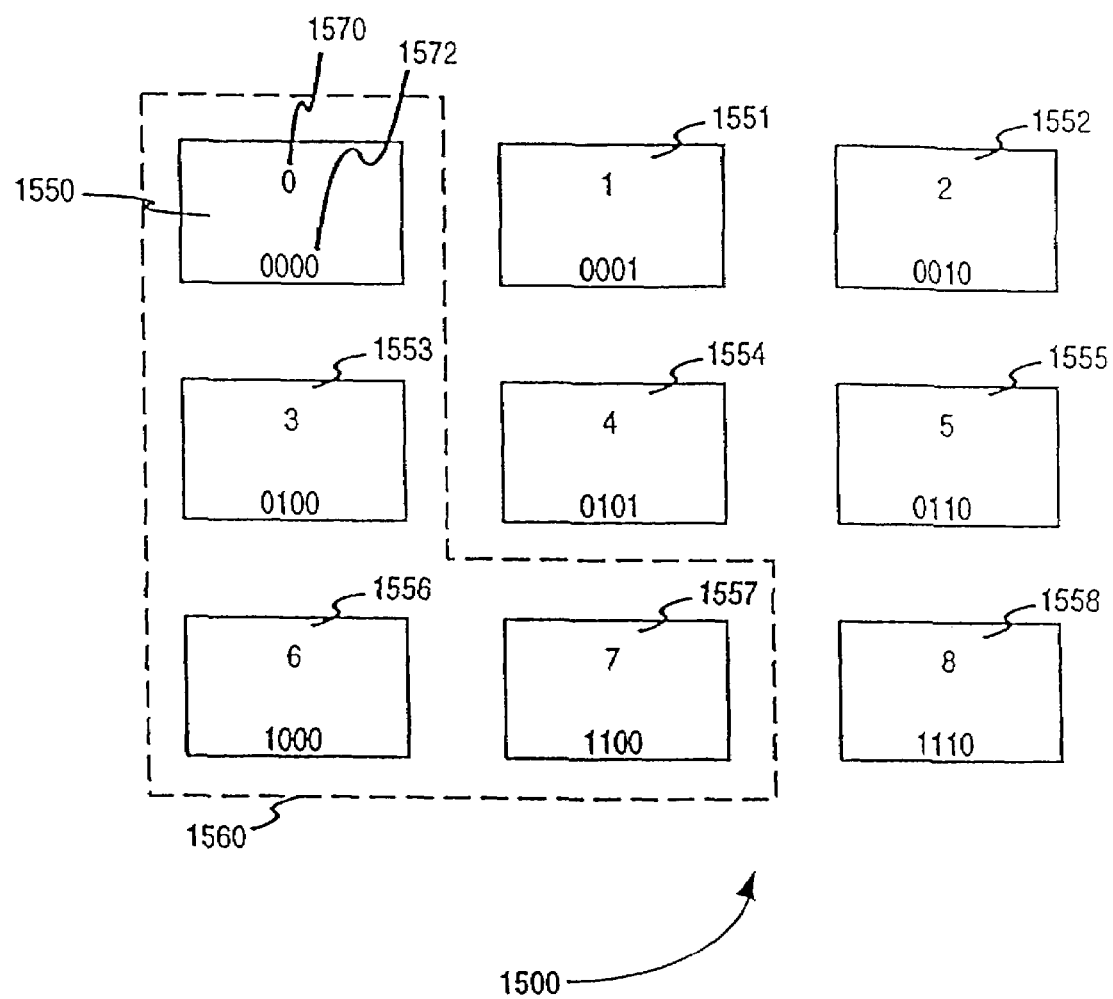
FIG. 30 shows the selection of MCPEs using an address mask in one embodiment.

FIG. 30 shows the selection of MCPEs using an address mask in one embodiment. The address masking selection scheme is used in the selection and reconfiguration of different MCPEs or groups of MCPEs in different regions of a chip to perform different functions in one embodiment. A different configuration may be selected for each MCPE on each different clock cycle. The selection of MCPEs for configuration and control, as previously discussed, is determined by applying a transmitted mask to either the physical address 1570 or the virtual address 1572 of the MCPEs 1550-1558. The masked address is then compared to a masked destination identification.

For example, MCPEs 1550-1558 have physical addresses 0-8, respectively. MCPE 1550 has virtual address 0000. MCPE 1551 has virtual address 0001. MCPE 1552 has virtual address 0010. MCPE 1553 has virtual address 0100. MCPE 1554 has virtual address 0101. MCPE 1555 has virtual address 0110. MCPE 1556 has virtual address 1000. MCPE 1557 has virtual address 1100. MCPE 1558 has virtual address 1110. In this example, the virtual address 1572 will be used to select the MCPEs, so the mask will be applied to the virtual address 1572. The mask is used to identify the significant bits of the virtual address 1572 that are to be compared against the significant bits of the masked destination identification in selecting the MCPEs. When mask (0011) is transmitted, the third and fourth bits of the virtual address 1572 are identified as significant by this mask. This mask also identifies the third and fourth bits of the destination identification as significant. Therefore, any MCPE having the third and fourth bits of the virtual address matching the third and fourth bits of the destination identification is selected. In this example, when the mask (0011) is applied to the virtual address and applied to a destination identification in which the third and fourth bits are both zero, then MCPEs 1550, 1553, 1556, and 1557 are selected. MCPEs 1550, 1553, 1556, and 1557 define a region 1560 and execute a particular function within the networked array 1500.

When the transmitted data comprises configuration data, manipulation of the selected MCPEs may comprise programming the selected MCPEs with a number of configuration memory contexts. This programming may be accomplished simultaneously with the execution of a present function by the MCPE to be programmed. As the address masking selection scheme results in the selection of different MCPEs or groups of MCPEs in different regions of a chip, then a first group of MCPEs located in a particular region of the chip may be selectively programmed with a first configuration while other groups of MCPEs located in different regions of the same chip may be selectively programmed with configurations that are different from the first configuration and different from each other. The groups of MCPEs of the different regions may function independently of each other in one embodiment, and different regions may overlap in that multiple regions may use the same MCPEs. The groups of MCPEs have arbitrary shapes as defined by the physical location of the particular MCPEs required to carry out a function.

When the transmitted data comprises control data, manipulation of the selected MCPEs comprises selecting MCPE configuration memory contexts to control the functioning of the MCPEs. As the address masking selection scheme results in the selection of different MCPEs or groups of MCPEs in different regions of a chip, then a first group of MCPEs located in a particular area of the chip may have a first configuration memory context selected while other groups of MCPEs located in different areas of the same chip may have configuration memory contexts selected that are different from the first configuration memory context and different from each other.

When the transmitted data comprises configuration and control data, manipulation of the selected MCPEs may comprise programming the selected MCPEs of one region of the networked array with one group of configuration memory contexts. Moreover, the manipulation of the selected MCPEs also comprises selecting a different group of configuration memory contexts to control the functioning of other groups of MCPEs located in different areas of the same chip. The regions defined by the different groups of MCPEs may overlap in one embodiment.

Thus, a method and an apparatus for retiming in a network of multiple context processing elements have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for using a data path comprising a plurality of processing elements (PEs) configured to perform a first set of functions, the method comprising:

transmitting a carry bit from an arithmetic logic unit of a first PE to an arithmetic logic unit of a second PE using a first carry chain, the first carry chain coupling the first PE with the second PE;

generating a signal in the second PE in response to the received carry bit wherein the signal includes a saturation signal and a saturation value of the data path; and transmitting the signal from the arithmetic logic unit of the second PE to the arithmetic logic unit of first PE using a second carry chain, the second carry chain coupling the second PE with the first PE and including a first back propagation channel configured to transmit the saturation signal and a second back propagation channel configured to transmit the saturation value; and in response to the signal, changing the operation of the data path from performing the first set of functions to performing a second set of functions, the first set of functions and the second set of functions being different from one another.

2. The method of claim 1, wherein the first PE comprises a least significant byte of the data path and the second PE comprises a most significant byte of the data path.

3. The method of claim 1, wherein transmitting the signal from the second PE to the first PE further comprises transmitting the signal through each PE of the data path, wherein each PE uses logic to manipulate a resident bit sequence in response to the signal.

4. The method of claim 3, wherein the logic is configurable.

5. The method of claim 1, further comprising:
transmitting configuration data to the plurality of PEs;
defining the data path by designating the plurality of PEs in response to the configuration data; and
programming the plurality of PEs that comprise the data path in response to the configuration data.

6. The method of claim 5, further comprising:
setting a flag in the first PE in response to the configuration data, the flag in the first PE designating the first PE as comprising the least significant byte of the data path; and
setting a flag in the second PE in response to the configuration data, the flag in the second PE designating the second PE as comprising the most significant byte of the data path.

7. The method of claim 1, wherein generating the signal further comprises using logic to test for saturation in the data path.

8. The method of claim 1, wherein the first and second carry chains support carry operations for non-local functions comprising saturated and minimum and maximum arithmetic functions.

9. The method of claim 8, wherein each PE of the data path is programmed to support the same function, the programming occurring through a function port of each PE.

10. The method of claim 1, wherein the first carry chain comprises a forward channel between the first and the second PEs.

11. The method of claim 1, wherein the second carry chain comprises a back propagation channel between the second and the first PEs, the back propagation channel coupling the plurality of PEs of the data path.

12. The method of claim 11, wherein a saturation signal is transmitted over the back propagation channel.

13. The method of claim 11, wherein a signal that selects a saturation value is transmitted over a second back propagation channel.

14. The method of claim 1, wherein the plurality of PEs comprises a plurality of multiple context processing elements.

15. The method of claim 1, wherein the first carry chain comprises a left-going carry chain.

16. The method of claim 1, wherein the second carry chain comprises a right-going carry chain.

17. The method of claim 1, wherein transmitting the carry bit from the first PE to the second PE further comprises transmitting the carry bit from a first arithmetic logic unit (ALU) of the first PE to a second ALU of the second PE.

18. The method of claim 1, wherein generating the signal in the second PE further comprises generating the signal in an arithmetic logic unit of the second PE.

19. The method of claim 1, wherein transmitting the signal further comprises transmitting the signal from an arithmetic logic unit (ALU) of the second PE to an ALU of the first PE.

20. The method of claim 1, wherein
the first PE includes a first arithmetic logic unit (ALU);
the second PE includes a second ALU; and
the carry bit is transmitted from the first ALU of the first MCPE to the second ALU of the second MCPE.

21. The method of claim 20, wherein generating the signal further comprises generating the signal in the second ALU of the second PE.

22. The method of claim 21, wherein transmitting the signal further comprises transmitting the signal from the second ALU of the second PE to the first ALU of the first PE.

23. An apparatus for using a data path comprising a plurality of processing elements (PEs) configured to perform a first set of functions, the apparatus comprising:

a first carry chain for transmitting a carry bit from an arithmetic logic unit of a first PE to an arithmetic logic unit of a second PE;

logic for generating a signal in the second PE in response to the received carry bit, wherein the signal includes a saturation signal and a saturation value of the data path;

a second carry chain, the second carry chain including a first back propagation channel and a second back propagation channel configured to transmit the signal from the arithmetic logic unit of the second PE to the arithmetic logic unit of the first PE, wherein the saturation signal is communicated over the first back propagation channel and the saturation value is communicated over the second back propagation channel; and programmable logic configured to change the operation of the data path from performing the first set of functions to performing a second set of functions in response to the signal, the first set of functions and the second set of functions being different from one another.

24. The apparatus of claim 23, wherein the first PE comprises a least significant byte of the data path and the second PE comprises the most significant byte of the data path.

25. The apparatus of claim 24, wherein the signal is transmitted from the second PE to the first PE by passing through each PE of the data path, and wherein each PE uses logic to manipulate a resident bit sequence in response to the signal.

26. The apparatus of claim 25, wherein the logic is configurable.

27. The apparatus of claim 23, further comprising:
a controller for transmitting configuration data to the plurality of PEs;
logic for defining the data path by designating the plurality of PEs in response to the configuration data; and logic for programming the plurality of PEs that comprise the data path in response to the configuration data.

28. The apparatus of claim 23, wherein the signal generated in the second PE is generated using logic, the logic testing for saturation in the data path.

29. The apparatus of claim 23, wherein the second carry chain comprises a back propagation channel between the second and the first PEs, the back propagation channel coupling the plurality of PEs of the data path.

30. The apparatus of claim 23, wherein the plurality of PEs comprises a plurality of multiple context processing elements (MCPEs).

31. The apparatus of claim 30, further comprising a configuration memory context in each of the plurality of MCPEs, the configuration memory context controlling each MCPE in response to the configuration data.

32. The apparatus of claim 23, wherein the first carry chain comprises a left-going carry chain.

33. The apparatus of claim 23, wherein the second carry chain comprises a right-going carry chain.

34. The apparatus of claim 23, wherein the first carry chain transmits the carry bit from an arithmetic logic unit (ALU) of the first PE to an ALU of the second PE.

35. The apparatus of claim 23, wherein
the first PE includes a first arithmetic logic unit (ALU);
the second PE includes a second ALU; and
the carry bit is transmitted from the first ALU of the first MCPE to the second ALU of the second MCPE.

36. The apparatus of claim 35, wherein the logic generates the signal in the second ALU of the second PE.

37. The apparatus of claim 35, wherein the signal is transmitted with the second carry chain from the second ALU of the second PE to the first ALU of the first PE.

38. A system for using a data path in a reconfigurable computing device, the system comprising:
an array of processing elements (PEs);
a network coupled to the array of PEs, the network transmitting configuration data;
a first carry chain for transmitting a carry bit from an arithmetic logic unit of a first PE to an arithmetic logic unit of a second PE;
a second carry chain for transmitting a signal from the arithmetic logic unit of the second PE to the arithmetic logic unit of the first PE, wherein the signal includes a saturation signal and a saturation value of the data path, and wherein the second carry chain includes a first back propagation channel for transmitting the saturation signal and a second back propagation channel for transmitting the saturation value; and
programmable logic configured to change the operation of the data path from performing a first set of functions to performing a second set of functions in response to the signal, the first set of functions and the second set of functions being different from one another.

39. The system of claim 38, further comprising logic for generating a signal in the second PE in response to the received carry bit.

40. The system of claim 39, wherein the logic is configurable.

41. The system of claim 38, wherein the first PE comprises a least significant byte of the data path and the second PE comprises a most significant byte of the data path.

42. The system of claim 38, wherein the signal is transmitted from the second PE to the first PE by passing through each PE of the data path, wherein each PE uses logic to manipulate a resident bit sequence in response to the at least one signal.

43. The system of claim 38, wherein the network comprises:
a transmitter for transmitting configuration data to the plurality of PEs;
logic for defining the data path by designating the plurality of PEs in response to the configuration data; and
logic for programming the plurality of PEs that comprise the data path in response to the configuration data.

44. The system of claim 38, wherein the signal generated in the second PE is generated using logic to test for saturation in the data path.

45. The system of claim 38, wherein each PE of the data path is programmed to support non-local functions comprising saturated and minimum and maximum arithmetic functions, the programming occurring through at least one function port of each PE.

46. The system of claim 38, wherein the first carry chain comprises a forward channel between the first and the second PEs.

47. The system of claim 38, wherein the second carry chain comprises a back propagation channel between the second and the first PEs.

48. The system of claim 47, wherein the back propagation channel couples the plurality of PEs of the data path.

49. The system of claim 38, wherein the first carry-chain comprises a left-going carry chain.

50. The system of claim 38, wherein the second carry-chain comprises a right-going carry chain.

51. The system of claim 38, wherein the plurality of PEs comprises a plurality of multiple context processing elements (MCPEs).

52. The system of claim 51, wherein each MCPE includes a configuration memory context.

53. The system of claim 38, wherein
the first PE includes a first arithmetic logic unit (ALU);
the second PE includes a second ALU; and
the carry bit is transmitted from the first ALU of the first MCPE to the second ALU of the second MCPE.

54. The system of claim 53, wherein the logic generates the signal in the second ALU of the second PE.

55. The system of claim 53, wherein the signal is transmitted with the second carry chain from the second ALU of the second PE to the first ALU of the first PE.

* * * * *